(12) United States Patent
Sideris

(10) Patent No.: US 7,611,658 B2
(45) Date of Patent: Nov. 3, 2009

(54) INJECTION BLOW MOULDING OF PLASTICS ARTICLES

(76) Inventor: Constantinos Sideris, 17 Arsakelou Str, Strovolos, Nicosia (CY) 2045

( * ) Notice: Subject to any disclaimer, the term of this patent is extended or adjusted under 35 U.S.C. 154(b) by 650 days.

(21) Appl. No.: 10/568,311

(22) PCT Filed: Mar. 2, 2005

(86) PCT No.: PCT/EP2005/002269

§ 371 (c)(1),
(2), (4) Date: Apr. 21, 2006

(87) PCT Pub. No.: WO2005/084920

PCT Pub. Date: Sep. 15, 2005

(65) Prior Publication Data

US 2006/0290034 A1 Dec. 28, 2006

Related U.S. Application Data

(60) Provisional application No. 60/549,463, filed on Mar. 3, 2004.

(30) Foreign Application Priority Data

Mar. 3, 2004 (GB) .................................. 0404689.2

(51) Int. Cl.
*B29C 49/06* (2006.01)
(52) U.S. Cl. ...................... 264/532; 264/537; 264/538; 425/529; 425/533; 425/534; 425/538
(58) Field of Classification Search .................. 425/522, 425/529, 533, 534, 537, 538; 264/532, 537, 264/538
See application file for complete search history.

(56) References Cited

U.S. PATENT DOCUMENTS

| 2,789,312 | A | * | 4/1957 | Borer | 425/526 |
| 2,853,736 | A | * | 9/1958 | Gussoni | 425/534 |
| 3,609,803 | A | * | 10/1971 | Fattori | 425/526 |
| 3,733,162 | A | * | 5/1973 | Farkas | 425/533 |
| 3,784,348 | A | * | 1/1974 | Aoki | 425/533 |
| 3,792,946 | A | * | 2/1974 | Zavasnik | 425/533 |
| 3,940,225 | A | | 2/1976 | Uhlig | |
| 3,988,100 | A | | 10/1976 | Julien | |
| 4,140,468 | A | * | 2/1979 | Duga | 425/534 |
| 4,422,843 | A | | 12/1983 | Aoki | |
| 4,473,515 | A | | 9/1984 | Ryder | |
| 4,579,518 | A | * | 4/1986 | Farrell | 425/539 |
| 5,067,891 | A | | 11/1991 | Julian et al. | |

(Continued)

FOREIGN PATENT DOCUMENTS

EP 0 810 919 12/1998

(Continued)

*Primary Examiner*—Robert B Davis
(74) *Attorney, Agent, or Firm*—Young & Thompson

(57) ABSTRACT

A composite mould set for use on a conventional type of injection-molding machine is made up of composite mold halves (10) which are mounted one on each platen (12) of the injection molding machine. Each mold half (10) carries an array of injection molding cavities (16) for molding preforms, and an array of blow molding cavities (18) for stretch blow molding of the preforms into a blow molded product. The respective cavities (16) and (18) are arranged so that they open in a common mold separation direction.

26 Claims, 21 Drawing Sheets

U.S. PATENT DOCUMENTS 5,874,115 A 2/1999 Dobler
2001/0031291 A1 10/2001 Takada et al.

FOREIGN PATENT DOCUMENTS

| | | |
|---|---|---|
| EP | 0 703 058 | 8/2001 |
| EP | 0 703 057 | 10/2001 |
| GB | 1152795 | 5/1969 |
| JP | 2002-254502 | 9/2002 |
| JP | 2003-320576 | 11/2003 |
| JP | 2004-276527 | 10/2004 |
| JP | 2005-059606 | 3/2005 |

* cited by examiner

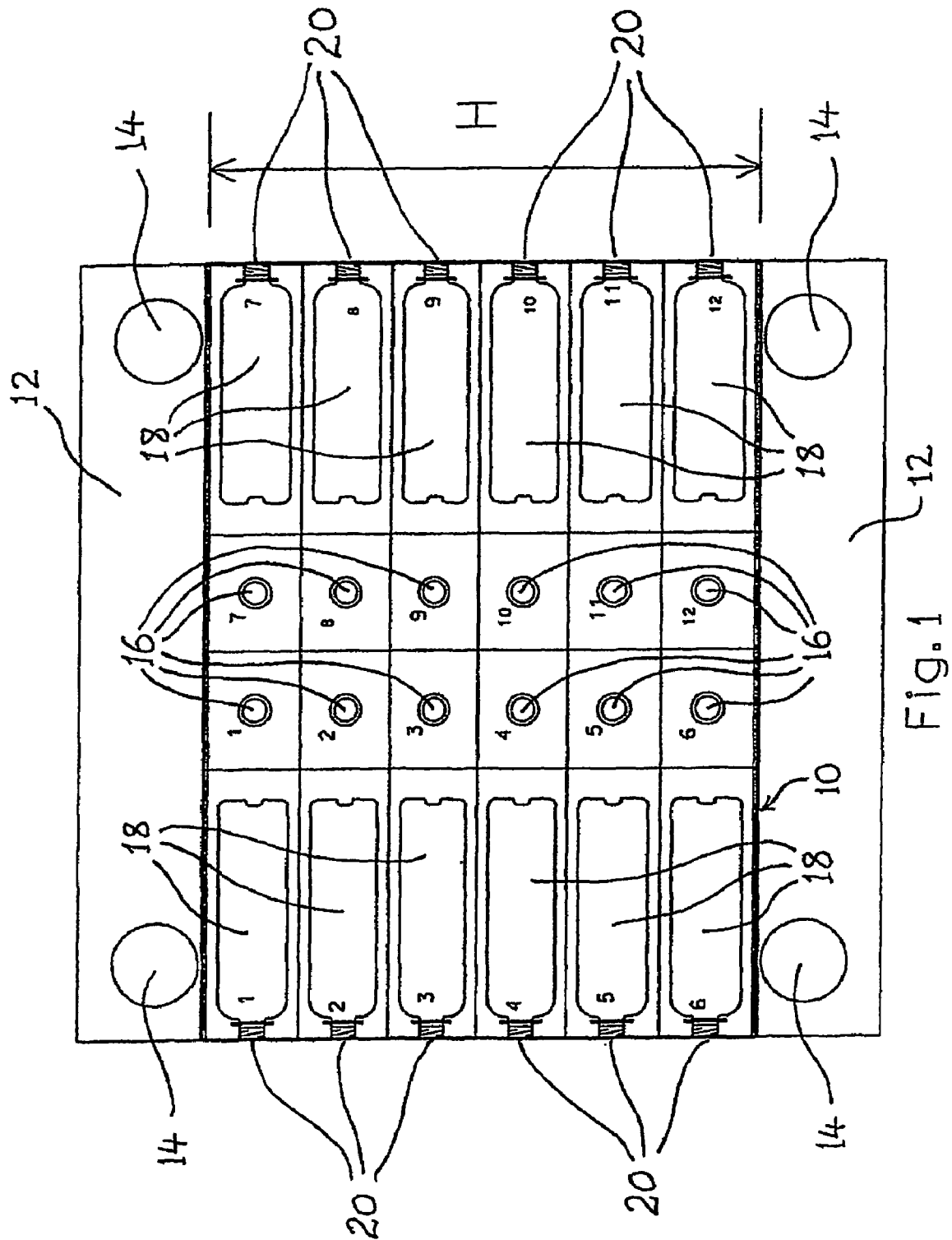

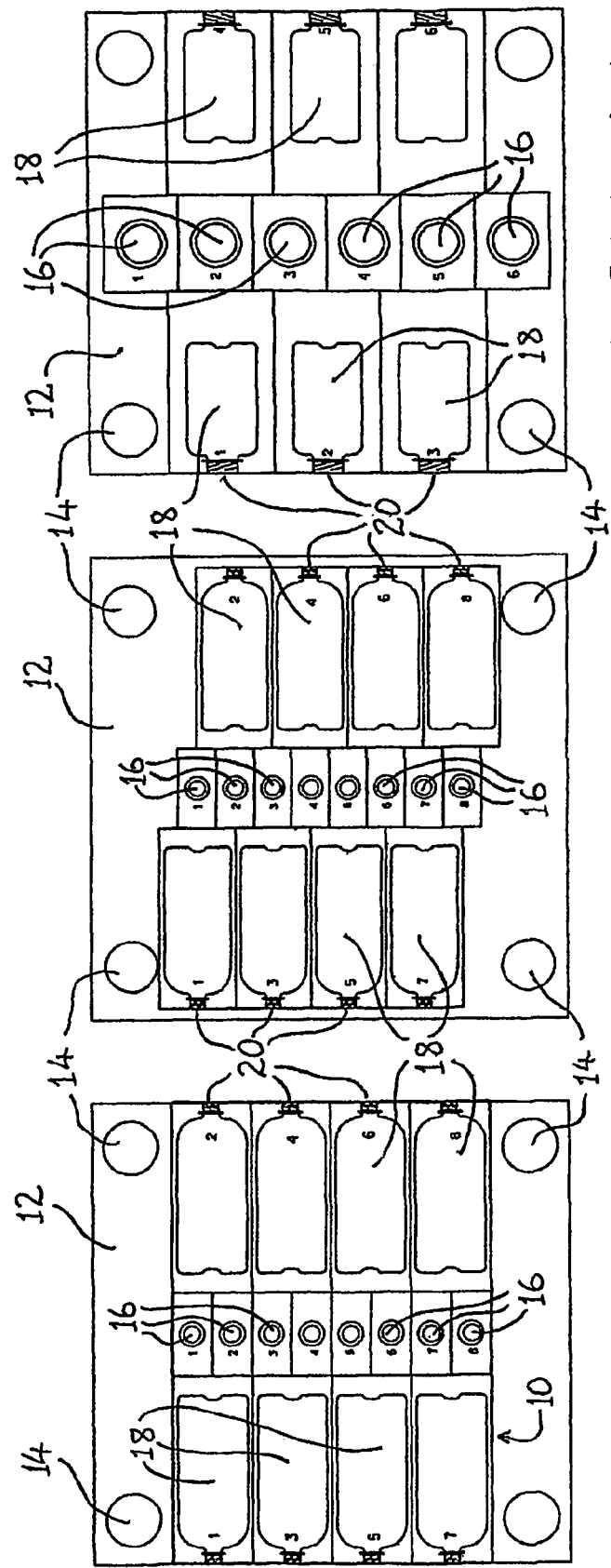

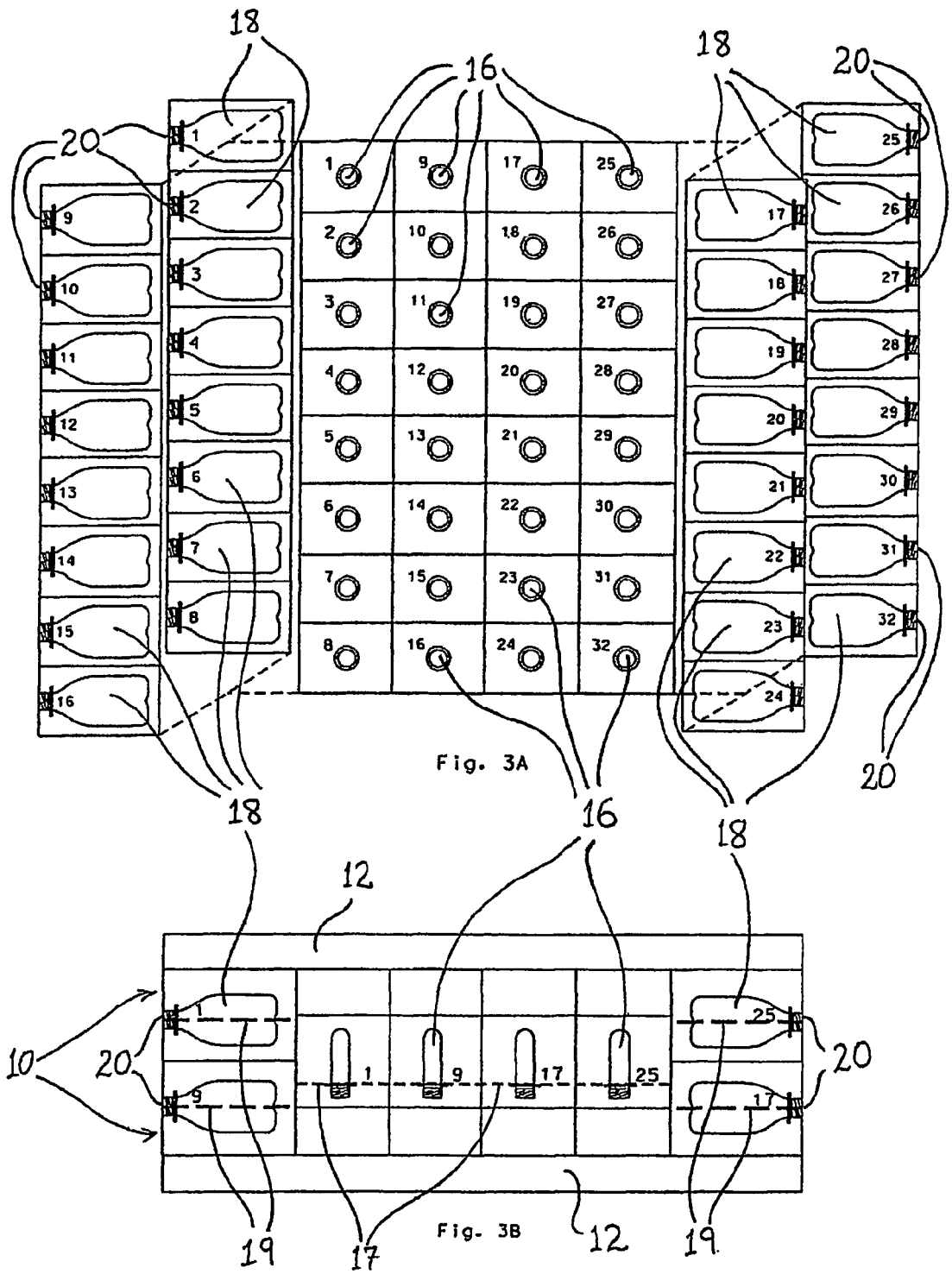

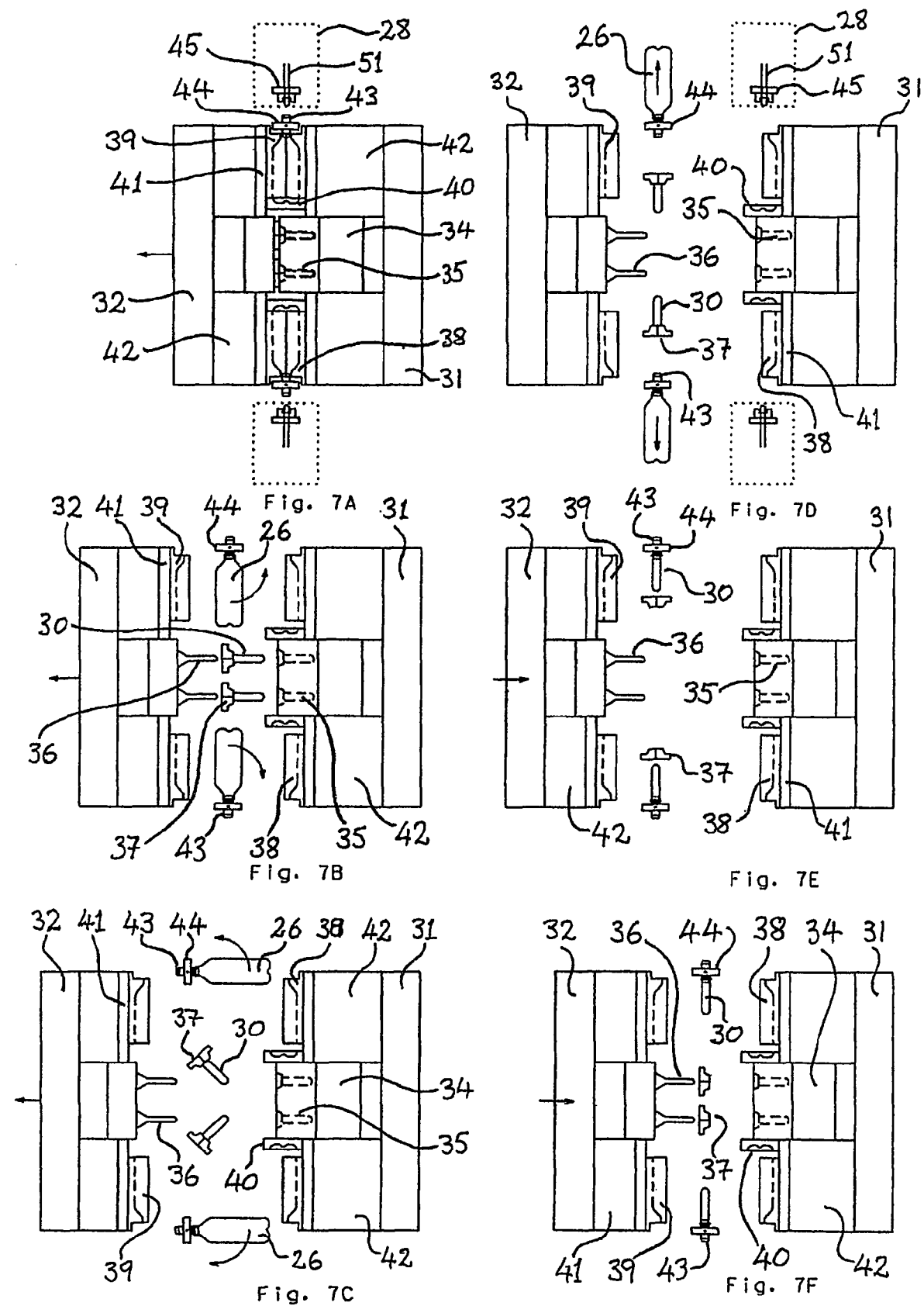

INJECTION BLOW MOULDING OF PLASTICS ARTICLES

The present invention relates to a method and apparatus for producing plastics articles such as hollow plastics containers (bottles, jars, cups, pails, etc.) by injection stretch blow moulding or injection blow moulding, and in particular but not exclusively to such methods and apparatus using a composite injection-blow mould set and an injection moulding machine.

BACKGROUND

Injection and stretch blow moulding machines and mould sets are commercially available for the production of hollow plastic containers. In the 'two-stage process', an injection moulding machine is used to mould preforms which are cooled to ambient temperature and stored for later use. Independently a stretch blow moulding machine uses these preforms, reheats them to a stretch-blow temperature, stretches them and blow moulds them in blow mould sets to the shape of the required container. Machines of many cavities have been developed for high production rates with this 'two-stage process', which are prohibitively expensive for processors requiring lower outputs. Also this 'two-stage process' is not well suited to containers with asymmetrical shapes (e.g. oval) or with wide neck openings (jars).

In the 'one-stage process' the two steps of injection moulding the preforms and stretch-blowing them into containers are achieved within one machine using machine-specific mould sets. The preforms are moulded in an injection mould set, cooled to their average stretch-blow temperature in this mould set and then the mould set opens and the preforms are transferred either to a conditioning station for further temperature conditioning or directly to a stretch-blow station where they are stretched and blown in blow mould sets into the final container shape. The formed containers are then taken to another station where they are released or ejected. These machines usually employ a vertical injection clamp and rotary mechanisms for transferring the products between stations.

One-stage machines are well suited to low production rates and to containers with asymmetric shapes or with wide neck openings. The one-stage process is less energy intensive than the two-stage process because it eliminates the need for complete cooling of the preforms and their reheating for stretch-blowing.

One-stage machines have several stations (injection, conditioning, stretch-blow, container ejection) and utilise complex and costly mechanisms for transferring the preforms between stations. Also they usually have separate clamping mechanisms for the opening and closing of the injection mould sets (vertical clamp) and of the blow mould sets (horizontal clamp). The mould sets used in one-stage machines are costly because, amongst other reasons, some mould components like neck formers or injection cores must be duplicated several times, as several sets are needed to carry preforms from station to station. Furthermore, these costly mould sets are machine specific and cannot be used on other machines. In view of these factors, one-stage machines require high capital expenditure per unit of production output.

Disadvantages of the one-stage machines include:
the need for complex preform transfer mechanisms,
the need for separate clamping mechanisms for injection and blow,
the duplication of mould components, and
the relatively low production rates.

Some attempts to use one clamping mechanism for both injection and blow mould sets have been made. In these attempts (e.g. Marcus Paul, U.S. Pat. No. 4,376,090), even though the blow mould set has been incorporated within the same clamping plates as the injection mould, the movement of these clamping plates is used to place the preforms in the blow cavities rather than to open and close the blow mould, because the blow moulds are oriented with their parting plane perpendicular to the clamping plates rather than parallel. This necessitates the use of separate mechanisms to open and close the blow moulds. Additionally some of these attempts (e.g. Pereira, WO 03/068483) have placed between the clamping plates not just the moulds but also the stretching mechanism. This requires that the clamping unit has a large distance between its plates to accommodate the stretching mechanism, requiring a purpose-built clamping unit, thus eliminating the possibility of using a standard or typical injection moulding machine.

The complexity of preform transfer mechanisms and the extent of costly duplication of mould parts is related to the number of process stations or product positions present within the machine or the clamping plates. Conventional attempts to eliminate some of the disadvantages of the one-stage machines, propose the use of a minimum of three such stations or positions, resulting in either complex transfer mechanisms or duplication of mould parts or both. Additionally such attempts have not succeeded in offering an increase in the output rates of the commercially available one-stage machines.

In this specification the terms 'injection (stretch) blow-moulding' and similar are used to describe a process in which an article is formed by injection-moulding a preform and then blow-moulding said preform with an optional stretching step. The term 'parting line' is used in the usual sense of describing a line along which the mould parts meet when the clamping unit closes or they separate when the clamping unit opens.

The term "mould separation direction" is used to mean a direction in which complementary parts of a mould may be moved apart to open the mould or brought together to close the mould. It will be appreciated that a mould cavity may be defined by just two mould halves, or it may be a composite mould with three or more relatively moveable moulding cavities e.g. defining the sides and base of the mould cavity. Where there are just two parts the mould usually has just one mould separation direction, but with more than two parts there is a correspondingly greater number of mould separation directions. In general, although not exclusively, the mould separation direction referred to will be the separation direction of the two largest parts of the mould.

GB-A-1152795 discloses an arrangement made up of an array of parison-forming cavities arranged in one plane and an array of blow moulding cavities in a forwardly spaced plane. In this arrangement the parison forming cavities open in a mould separation direction which is perpendicular to the mould separation directions of the blow moulding cavities.

EP-A-0703058 discloses a composite arrangement comprising a preform mould above a primary mould. Neither of the moulds is an injection moulding cavity as both are blow moulding cavities. After initial blowing of a parison into the preform mould, the preform mould as opened and the primary mould is interposed between the separated halves of the preform mould. This arrangement requires a special extended reach clamp and a separate jack and guide system for the primary mould. The preform and primary moulds are used one after the other and open to release a preform and a final product at different stages. The mould set does not open to release injection-moulded preforms, and blow-moulding products at the same time.

EP-A-0703057 discloses an arrangement in which an inner preform blow-moulding cavity is provided which can be interposed between the plates of an outer primary blow-moulding cavity. There is no disclosure of an array of injection-moulding cavities and an array of blow-moulding cavities, nor of an arrangement in which the mould set opens to release injection moulded, and blow-moulded items at the same time.

Accordingly, there is a need for an apparatus and method which possess the advantages of the one-stage process in terms of lower energy requirements and the ability to cope with asymmetric shapes or wide necks, but which does not require costly duplication of equipment (clamp units, mould parts) and high investment in purpose-built machinery. There is also a need for a mould set which can be mounted in conventional types of injection-moulding machines and which makes use of the existing platen actuators for opening and closing of both the injection-moulding cavities and the blow-moulding cavities.

Preferred embodiments of this invention provide a one-stage method and apparatus for injection (stretch) blow moulding of plastics containers, which utilises a single clamping unit (one station) for opening and closing of both injection and blow moulds.

Preferred embodiments use only one composite injection-blow mould set as a single station in the single clamping unit, with only two types of preform/container location within it (injection location and stretch-blow location) thus eliminating complex preform transfer mechanisms and also eliminating duplication of mould parts.

Preferred embodiments possess the advantage that the said composite injection-blow mould has a construction such that it can be used on any typical injection moulding machine with a large enough clamping unit to accommodate it, thus giving additional production flexibility to its user.

In preferred embodiments, the said composite injection-blow mould has a modular construction such that different containers can be produced on the same composite mould by changing only some mould parts like blow cavities, injection cores, injection cavities or neck formers.

In preferred embodiments, the method can be implemented either using a standard low cost injection moulding machine or a specifically adapted low cost injection moulding machine.

In preferred embodiments, the produced containers can be ejected in an ordered way so that if needed a transport system (belt conveyor, air conveyor, etc) can be provided to deliver the containers to storage or further processing, including in-line filling of the containers.

Preferred embodiments provide a process capable of producing containers which do not necessarily have a neck support ring just below the neck area.

Another benefit of preferred embodiments is that the process can be implemented using a fully electric injection moulding machine, in case health and cleanliness criteria require it, for foodstuffs and pharmaceutical applications for example.

In the preferred embodiments, the said method and apparatus will require a substantially lower capital investment and/or provide higher output rates than present one-stage methods, while maintaining the required container quality.

SUMMARY OF THE INVENTION

Accordingly, in one aspect of this invention there is provided a mould set for use in a method of moulding plastics articles wherein a preform is injection-moulded in an injection moulding cavity and the injection-moulded preform is blow-moulded in a blow-moulding cavity, said mould set comprising an array of injection-moulding cavities and an array of blow-moulding cavities, each of the cavities in each of the arrays being defined by at least two mould parts separable in a respective mould separation direction, wherein the mould separation directions of said injection-moulding cavities and of said blow-moulding cavities define a common mould separation direction whereby, in use, the mould may be opened in the common mould separation direction to release the injection-moulded preforms and the blow-moulded products.

In this arrangement, the injection-moulding cavities and the blow-moulding cavities are arranged with their parting lines selected such that there is a common mould separation direction. In this way, not only may the preforms be formed in the injection-moulding cavities during the same cycle as previous preforms are blow-moulded into the blow-moulding cavities, but also a single movement may be used to open both sets of cavities. Furthermore, the closing force of the single clamping unit that can be used to open/close the cavities, is utilized to resist both the injection pressure in the injection-moulding cavities and the blowing pressure in the blow-moulding cavities, keeping all cavities securely closed. In many situations, the parting line is co-planar, in which case the parting lines of both the injection-moulding cavities and the blow-moulding cavities are parallel to each other and perpendicular to the mould separation direction. It will also be appreciated that some mould cavities may be defined by two main cavity halves, and a separate base part. In these and other multiple part mould cavities, references herein to the mould being opened to release the product mean that at least two parts of the mould have been moved apart such that the product may be discharged from the mould with further movement of the other part or parts of the mould if required.

Although numerous different shapes of blow-moulded articles may be formed using the mould set, in a particularly preferred arrangement, the blow-moulding cavities are generally elongate, with the longitudinal axes of the blow-moulding cavities extending generally perpendicularly to the mould-separation direction. Orienting the longitudinal axes of the blow-moulding cavities perpendicular to the common mould-separation direction may provide a compact arrangement and reduce the distance by which the mould set parts must separate to allow removal of the blow-moulded article.

Numerous different configurations of arranging the blow-moulding cavities and the injection-moulding cavities are possible. In one arrangement, the blow-moulding cavities are disposed in an array to one or both sides or to the top and/or bottom of the mould set, with the necks of the blow-moulding cavities arranged adjacent the periphery of the mould set. This provides the advantage that the necks of the blow-moulding cavities are accessible transversely of the mould set. This is a very important preferred feature because it allows suitable stretching means to be located outside the clamp area and enter the cavities transversely. As a result, the distance between the clamping plates of many typical injection moulding machines is sufficient to house the required moulds and mechanisms. If the stretching means are located in the clamp area with their axes of movement being parallel rather than transverse to the mould-separation direction, then purpose-built clamping units would be required, with a much longer distance between the clamping plates.

The injection-moulding cavities may be disposed in the generally central array in the mould set.

Conveniently, each injection-moulding cavity can be aligned with a respective blow-moulding cavity, so that a collection of injection-moulded preforms may be moved in a single direction from the injection-moulding cavities to the associated blow-moulding cavities. In other arrangements, the injection-moulding cavities may be offset with respect to their respective blow-moulding cavities.

In one arrangement, the blow-moulding cavities are arranged as a group of a preset number (n) of rows (or columns) of a preset number (m) of cavities on one side of the mould set, and a generally symmetric group of said preset number (n) of rows (or columns) of (m) cavities on an opposite side of the mould set, with the necks of the blow-moulding cavities facing outwardly at the edges of the mould sets, and the injection-moulding cavities are disposed between the two groups of blow-moulding cavities and arranged in a rectangular array of (2n×m) cavities, with n being an integer greater than or equal to 1. In this arrangement, therefore, each row (or column) of blow-moulding cavities at the edge of the mould set is associated with an aligned row (or column) of injection-moulding cavities towards the centre of the mould set.

Where required, there may be two rows (or columns) of blow-moulding cavities on each side of the moulding set, the rows (or columns) being stacked or spaced in the direction of the common mould-separation direction.

In another arrangement, the blow-moulding cavities may be disposed in two rows (or columns) of cavities at equal spacing, one to either side of the mould set, with the rows (or columns) being offset with respect to each other by one half of the cavity spacing, and the injection-moulding cavities being disposed in a single row (or column) generally centrally between the blow-moulding cavities and each being aligned with a respective blow-moulding cavity.

It is preferred for the mould set to be a composite article comprising two main body portions, and a plurality of modular, removable or replaceable mould set components. The modular mould set components may include one or more of the following: injection cores, injection neck formers, injection cavities, and blow cavities.

In another aspect, this invention provides an injection moulding apparatus for injection (stretch) blow-moulding of plastics articles, said apparatus comprising:

a mould set comprising an array of injection-moulding cavities and an array of blow-moulding cavities, each of the cavities in each of the arrays being defined by at least two mould parts separable in a respective mould separation direction, wherein the mould separation directions of said injection-moulding cavities and of said blow-moulding cavities define a common mould separation direction whereby, in use, the mould may be opened in the common mould separation direction to release the injection-moulded preforms and the blow moulded products;

injection means for injecting plastics material into said injection-moulding cavities to produce said injection-moulded preforms;

mould opening means for opening and closing said mould set in use to allow release of injection-moulded preforms and blow-moulded products;

preform transfer means for transferring injection-moulded preforms from the injection-moulding cavities to the blow-moulding cavities, and blow-moulding means associated with said blow-moulding cavities and operable for blow-moulding injection-moulded preforms thereinto.

Preferably, the injection-moulding apparatus comprises two facing platen means mounted on a base structure, wherein a first part, or array of parts, of said mould set is secured to one of said platen means and a second part, or array of parts, of said mould set is secured to the other of said platen means, the apparatus further including platen drive means for effecting relative linear movement of said mould parts between a closed position and an open position, thereby serving as said mould opening means.

Preferably, the blow-moulding cavities include neck regions disposed adjacent the edge of the mould set and externally accessible transversely relative to the axis of said opening and closing movement. The blow-moulding means are preferably disposed generally transversely of said mould set and are operable to apply blow-moulding pressure via said neck region. Such blow moulding means may include devices called blow cores, through which high pressure air is introduced into the preforms in the blowing cavities.

Where the apparatus is to be used to form articles by injection stretch blow-moulding, the apparatus preferably includes an elongate stretch means, such as a rod, operable to be introduced in use transversely into the cavity within a preform held in a blow-moulding cavity, thereby to apply a stretching force before or during the blow-moulding.

In particular embodiments, the injection-moulding apparatus may include an array of injection core means, and an array of injection neck-forming means. In one arrangement, the number of injection-mould core means is equal to the number of injection-moulding cavities. In other arrangements, the number of injection-mould core means is equal to an integral multiple of the number of the injection-moulding cavities.

Similarly, the number of injection neck-forming means may be equal to the number of injection-moulding cavities, or it may be an integral multiple thereof.

Where the neck-forming means are equal in number to the injection-moulding cavities, the array of neck-forming means may be operable in use to transfer the injection-moulded preforms from the array of injection-moulding cavities along at least part of the way to the array of blow-moulding cavities.

The apparatus may include preform transfer means for transferring in use injection-moulded preforms to the blow-moulding cavities from at least part of the way along the path from the injection-moulding cavities. The preform transfer means may comprise any suitable arrangement but typically comprises an array of neck gripping means for engaging in use the neck of a preform. The neck gripping means may grip the neck internally or externally.

Where the injection-moulding apparatus includes elongate stretch means, it preferably includes actuation means for introducing and withdrawing said elongate stretch means to and from the blow-moulding cavities, the actuation means possibly being further operable to apply movement to move said preforms from said injection-moulding cavities to said blow-moulding cavities and/or to transfer said blow-moulded products from said blow-moulding cavities.

In another aspect, this invention provides a method of blow-moulding plastics articles, which comprises the steps of:

providing a mould set comprising an array of injection-moulding cavities and an array of blow-moulding cavities, each of the cavities in each of the arrays being defined by at least two mould parts separable in a respective mould separation direction, wherein the mould separation directions of said injection-moulding cavities and of said blow-moulding cavities define a common mould separation direction whereby, in use, the mould may be opened in the common mould separation direction to release the injection-moulded preforms and the blow moulded products; locating a plurality of previously injection-moulded preforms in said blow moulding cavities;

closing said mould set;

forming injection-moulded preforms using said injection-moulding cavities;

stretching and/or blow-moulding said injection-moulded preforms into said blow-moulding cavities;

opening said mould set to release said injection-moulded preforms and said blow-moulded products, and transferring said injection-moulded preforms to said blow-moulding cavities.

In a preferred aspect, in each period between the mould closing and the mould opening, a plurality of injection-moulded preforms are formed in the injection-moulding cavities and a plurality of previously formed injection-moulded preforms are blow-moulded in said blow-moulding cavities.

The various embodiments of composite injection-blow mould illustrated herein comprise a set of moulds that can be mounted together or separately onto the plates of the clamping unit of an injection moulding machine. This mould set consists of an injection mould with cavities for the moulding of preforms, and blow moulds with cavities for blowing the preforms into containers. The novel way of arranging the blow cavities in relation to the injection cavities and the clamping plates, allows for a maximum number of cavities to be fitted inside the clamping plates thus maximising the production rate, and also allows the use of a standard low-cost injection moulding machine, which could also be a fully electric machine.

In these embodiments the parting lines of the blow-moulds are placed parallel with the injection mould parting line and also parallel to the clamping plates. In this way the opening and closing of the clamping plates achieves opening and closing of both the injection and the blow cavities simultaneously. In this manner the clamping force of the clamping unit keeps both injection and blow moulds securely closed against the injection pressure and the blowing pressure. This arrangement also means that the centre-line of the containers (or blow cavities) is perpendicular to the centre-line of the preforms (or injection cavities) and parallel with the clamp plates, which allows the overall mould thickness (distance between clamping plates) to be relatively small even for tall containers, so that the mould set can fit on standard injection moulding machines. This novel orientation of the blow cavities also means that the stretch mechanism can be placed outside the clamp area, without placing any additional requirements on the size of the clamping unit of a standard injection moulding machine. Existing attempts to use an injection moulding machine for producing stretch blow moulded containers have placed the stretching means within the clamping plates, resulting in the requirement for purpose-built machines due to the need for a very long distance between clamping plates to accommodate the stretching means.

In a typical composite mould set there may be one, two or four vertical rows of injection cavities for preforms, placed centrally on the clamping plates. With the clamping plates of injection moulding machines being square or nearly square, this vertical arrangement of injection cavities would leave space on either side of the injection mould available for blow cavities. The same number of blow cavities as injection cavities are placed, half on one side and half on the other side of the injection cavities. The blow cavities may be arranged so that the necks of the containers are towards the outside edges of the clamp plates, facing sideways, upwards or downwards, so that the stretch rods—where employed—can enter the cavities from the sides, the top or the bottom of the clamping unit. Typically the blow cavities may be arranged with the container necks facing the sides of the clamp and the container bases facing the centre of the clamp towards the injection cavities. Although not preferred, it is possible to place injection and blow cavities asymmetrically on the clamp plates.

The composite injection-blow mould set could be of a modular design, with interchangeable parts such as injection cores, injection neck formers, injection cavity plates (or housings), injection cavities or blow cavities, so that several container shapes/sizes could be produced using the same mould set. The arrangement of cavities in the mould set may determine the maximum container neck diameter, body diameter and height, but within these restrictions several container shapes and sizes can be produced. As a result, each mould set would have the flexibility of producing a variety of containers without excessive mould cost. Also just a few standard mould sets, each having a specific configuration of cavity arrangements, could be used to cover most container shapes and sizes.

With the examples of the method of the present invention described below, in a typical production cycle when the clamping unit of the machine opens, there are the ready containers to be removed from the blow moulds and there are also ready preforms, which must be transferred from the injection cavities to the blow cavities ready to be blown into containers in the next cycle. These movements are made while the mould set is in the open position or while opening and closing. After the clamping unit closes, the next set of preforms is injected and also containers are blown from the preforms just placed in the blow cavities. The preforms are not cooled completely as in the 2-stage process, but are cooled only to the temperature of stretch/blowing as in the 1-stage process, so that they can be transferred directly to the blow cavities. During the transfer time from the injection to the blow cavities, it would be possible if needed to further condition the temperature of the preforms.

Several alternative preform transfer and container removal methods are described below, most of which do not require any duplication of mould parts like injection cores or injection neck formers. Unlike the related art, the composite mould set described below can contain only one neck former and one core for each cavity of production, minimising mould cost and complexity. The duplication of injection mould neck formers may be preferred in the cases when the container to be produced must be without a neck ring (support ring), but even in these cases neck former duplication may not be necessary.

There are numerous ways in which the transfer of preforms from the injection to the blow cavities can be achieved, which can be classified into two types of preform transfer methods as follows:

1) Methods in which there is only one set of neck formers, which release the preforms and return to their position in the injection mould for the next cycle. In such cases the preforms are held in their stretch-blowing position, not by the injection neck formers, but by other neck holding devices and/or the neck portion of the blow moulds. (Referred to as Type 1 preform transfer methods).

2) Methods in which the preform is held in the stretch-blowing position (in the blow mould) by the injection neck formers. In such cases the neck formers transport the preform from the injection cavity to the blow cavity without releasing it, so several sets of neck formers are needed. (Referred to as Type 2 preform transfer methods).

Type 1 methods can vary depending on how far the neck formers take the preforms before releasing them in order to return to their position in the injection mould. There are two basic variations of Type 1 preform transfer methods that can be used in the illustrated embodiments:

a) the neck formers transport the preforms part of the way or all the way to their stretch-blowing position, release them and return to the injection mould for the next cycle;

b) the neck formers do not travel away from their injection moulding position but just open to release the preforms onto another device like a robot arm, which will transport them to their stretch-blowing position. While in this device, the preforms could undergo further temperature conditioning if needed.

In the two above variations of Type 1 preform transfer methods, the preforms can be held in the stretch-blowing position by neck holders, which hold the preforms from the inside surface of the neck, in a way similar to that used in the stretch blow moulding machines of the 'two stage process'. Alternatively the preforms can be held in the stretch-blowing position by the blow cores (the devices which introduce the blowing air into the blow cavities), in a similar way to that used in the 'one-stage process'. Additionally when the blow mould closes, its neck portion can hold the preforms from the outside of the neck, around the support ring or around the neck screw threads of the preforms. In the latter case there is no need for a neck support ring to be incorporated in the preform design because it is held from the neck screw threads.

Also in the two above variations of Type 1 preform transfer mechanisms, the current invention provides for the removal of the ready containers when the mould opens, by moving the neck holders that hold them. The neck holders can move the ready containers out of the mould, release them and then move in position to take the next set of preforms that have been injection moulded in the previous cycle. Alternatively, to save time, there could be two sets of neck holders, one removing the containers and releasing them or delivering them to a transport system, and one taking the new set of preforms that have been injection moulded in the previous cycle.

Another alternative is to employ an independent container removal mechanism, that can move in, grip the containers, remove them from the neck holders or blow cores, move them away from the cavities and release them or deliver them to a transport means.

Type 2 methods can vary depending on how many sets of neck formers are used. There are two basic variations of Type 2 preform transfer mechanisms that can be used in the illustrated embodiments:

a) with two sets of neck formers that interchange positions between injection and blow cavities each cycle. The set that is in the blow cavities would release the ready containers and then be positioned in the injection mould for the next cycle. The set that is in the injection mould would not release the preforms but instead transport them to the blow cavities and remain there for the next cycle.

b) with three sets of neck formers that interchange positions between injection cavities, blow cavities and container delivery/ejection position or additional temperature conditioning position.

With all the different methods described for the removal of the ready containers, the possibility exists to simply eject the containers, or to deliver them in an orderly way to a transport system (like a band or air conveyor), or to carry out additional operations on the containers like filling them. These additional operations could be separate from the container production process or they could be incorporated in it. In the former case for example the containers could be released from the neck formers or neck holders delivered to a transport system that carries them to a filling machine for in-line filling. In the latter case the filling could be an additional station of the described apparatus, adjoining the injection moulding machine such that the containers are filled before being released and transported away. The containers could still be held by the neck formers or neck holders while being filled. In this case one additional set of neck formers or neck holders may be needed.

In embodiments where the preform is stretched a mechanism may also be provided to move the stretch rods in and out of the blow cavities in order to achieve lateral orientation of the material. Further a device is provided, usually called a blow core, for allowing air to enter the blow cavities. Such stretching and blowing mechanisms would be similar to those used in existing 'one-stage' or 'two-stage' machines.

There are several movements required for the methods for preform transfer, container removal, container delivery (if needed), stretching (if needed) and blowing. These movements can be achieved in many ways, including any combination of the following (in order of preference):

by the movement of the machine clamping plates;

by the movement of the machine ejector;

by pneumatic or hydraulic actuators;

by electric or hydraulic motors.

It is preferred when one of the above ways is used to achieve as many of the required movements as possible. For example the movement needed to remove the finished containers and to transfer the preforms to the blow position may be parallel to the stretch rod movement so the same actuator(s) can be used to carry out these movements. The movement mechanisms can be located within the mould set and/or fixed to the mould and/or mounted on a frame attached to the machine and/or mounted on a free standing structure.

The composite injection-blow mould set described below as well as the associated mechanisms, can be mounted in/on the clamping unit of a standard injection moulding machine, minimising the investment in machinery. Usually the clamping units of such machines are horizontal but standard machines with vertical clamps can also be used. The present invention also extends to a modified injection moulding machine with re-sized clamping unit (with larger clamping plates, accommodating larger mould thicknesses and/or more cavities, and possibly with adjusted clamping force) and/or a re-sized injection unit, to ensure that the relative sizing of these components of an injection moulding machine are preferentially selected for the present method to maximise output and minimise energy consumption. Depending on the mechanisms for stretching, container removal and preform transfer, it may be beneficial to adjust the programming sequence of the injection-moulding machine in order to better optimise the process. All such modifications and adjustments from the standard injection moulding machines are considered minor and are not expected to have much impact on machine cost. Further, the present invention provides for additional stations to be used for more operations to the ready containers, like filling, capping, handle application, labeling etc.

Whilst the invention has been described above, it extends to any inventive combination of the features set out above or in the following description.

BRIEF DESCRIPTION OF THE DRAWINGS

The invention may be performed in various ways and, by way of example only, specific embodiments thereof will now be described in detail, reference being made to the accompanying drawings.

FIGS. 1 to 5 illustrate various ways in which cavities can be arranged within the clamping unit of an injection moulding machine in embodiments of this invention, in which:

FIG. 1 illustrates a cavity arrangement of a composite injection-blow mould set in accordance with this invention, with two rows of preform cavities.

FIGS. 2(a), 2(b) and 2(c) are respective elevation views on three variants of a cavity arrangement of a composite injection-blow mould set in accordance with this invention, with one row of preform cavities.

FIGS. 3(a) and 3(b) are elevation and plan views respectively of a cavity arrangement of a composite injection-blow mould set in accordance with this invention, with four rows of preform cavities.

FIG. 5 is an elevation view on a cavity arrangement of a composite injection-blow mould set in accordance with this invention, specific to two injection cavities and two blow cavities.

FIGS. 6 to 13 illustrate various ways in which the transfer of preforms from the injection to the blow cavities and the removal of the ready containers from the blow cavities can be achieved in embodiments of this invention, in which:

FIGS. 7 (a) to (f) are plan views of a composite injection-blow mould set in accordance with this invention, with preform holders, at various stages during a production cycle.

FIGS. 8 (a) to (f) are plan views of a composite injection-blow mould set in accordance with this invention, without preform holders, at various stages during a production cycle.

FIGS. 9 (a) to (f) are plan views of a composite injection-blow mould set in accordance with this invention, with robot arm preform transfer arrangement, at various stages during a production cycle.

FIGS. 10 (a) to (f) are plan views of a composite injection-blow mould set in accordance with this invention, with two sets of neck holders, at various stages during a production cycle.

FIGS. 11 (a) to (f) are plan views of a composite injection-blow mould set in accordance with this invention, with preform delivery from the cavity side of the injection mould, at various stages during a production cycle.

FIGS. 12 (a) to (d) are plan views of a composite injection-blow mould set in accordance with this invention, with common movements of stretch rods, at various stages during a production cycle.

FIGS. 13 (a) to (f) are plan views of a composite injection-blow mould set in accordance with this invention, with two sets of neck formers, at various stages during a production cycle.

FIGS. 14 to 20 illustrate the implementation of one possible preform transfer method in the case of a cavity arrangement with two rows of preform cavities and the transfer of preforms without using preform holders in embodiments of this invention, in which:

FIG. 15 is a perspective view of the preform transfer mechanism.

FIG. 17 is a perspective view of all the mechanisms at the end of the mould-opening phase of the production cycle.

FIG. 18 is a perspective view of all the mechanisms during the beginning of the mould open phase of the production cycle.

FIG. 19 is a perspective view of all the mechanisms towards the end of the mould open phase of the production cycle.

FIG. 20 is a perspective view of all the mechanisms at the beginning of the mould-closing phase of the production cycle.

DESCRIPTION OF PREFERRED EMBODIMENTS

Figure 4B:
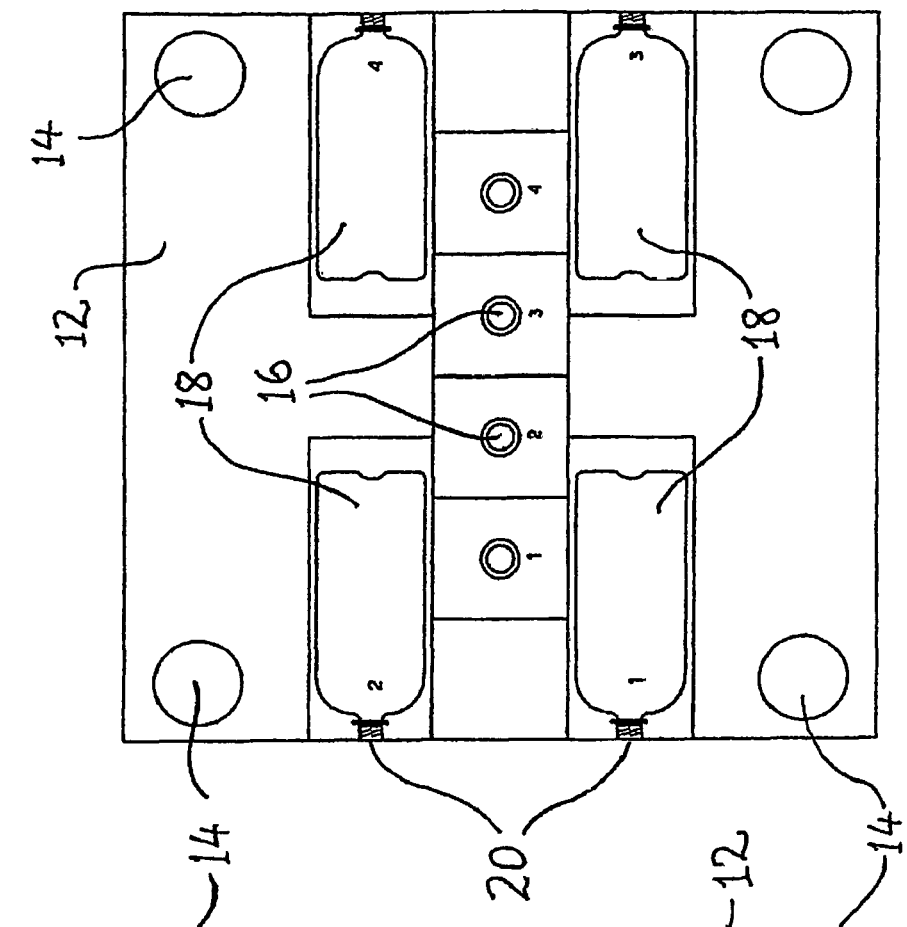
FIGS. 4(a) and 4(b) are respective elevation views on a cavity arrangement of a composite injection-blow mould set in accordance with this invention, specific to four injection cavities and four blow cavities.

In the arrangements described below a composite mould set is made up of composite mould halves 10, which are mounted one on each machine clamping plate 12 (or platen) respectively of an injection moulding machine. The clamping plates are connected by four tie bars 14 in conventional manner.

A variety of different cavity arrangements can be used in the composite mould set of the present invention, with preference being given to symmetrical arrangements for even pressure loading of the clamp unit.

One such preferred arrangement is illustrated in FIG. 1, in which there are two vertical rows of preform cavities 16 arranged centrally in the machine clamping plate 12. The number of preform cavities per row shown in FIG. 1 is just an example. There could be more or fewer cavities per row, depending on the container's maximum neck diameter, the production output required and the size of the clamping unit of the machine to be used. This cavity arrangement would generally be most suitable for medium production rates of various medium sized containers in the range of 0.5 to 2.0 liters. The centre lines of the preform cavities 16 are perpendicular to the clamping plates 12 as is usual in conventional preform moulds. The total height (H) of each row of blow moulds is preferred not to exceed the vertical clearance between the tie bars 14 of the machine's clamping unit, in order to facilitate changeovers of mould sets and movements for the preform transfer mechanism.

For each preform cavity 16 there is a corresponding blow cavity 18 to which the injection moulded preform will be transferred for stretch-blowing. The blow cavities 18 corresponding to the left row of preform cavities are arranged in a row and placed to the left of this row of preform cavities, with the centre lines (and parting lines) of the blow cavities 18 being parallel with the clamping plates 12. Accordingly the blow cavities 18 corresponding to the right row of preform cavities 16 are arranged in a row and placed to the right of this row of preform cavities. The injection and also the blow cavities in FIG. 1 are numbered from 1 to 12 so there is one injection cavity and one blow cavity with the same number. These are corresponding cavities, whereby the preform from an injection cavity marked with a certain number will be transferred to the blow cavity marked with the same number, for stretch-blowing in the next cycle. This is a preferred arrangement of corresponding cavities for ease of preform transfer, but a different corresponding arrangement can be used.

In FIG. 1 the necks 20 of the containers are shown near the edge of the mould set, which is near the edge of the clamping plate 12. This neck position allows stretch rods (not shown) to enter the blow cavities from the side, so that the stretching mechanism is outside the clamping plate area, allowing the entire area to be used for cavities. Also this neck position allows a maximum container height to be produced on the mould set. If the container height was less than the one illustrated in FIG. 1, it would be possible to locate the neck position away from the clamping plate's edge and nearer the preform cavities. However, the preferred neck position is the one shown near the edge, so that the same mould set with the same preform transfer movements can be used for containers of various heights just by changing some mould parts and without major change of the preform transfer movements.

Another preferred cavity arrangement is illustrated in FIG. 2, and consists of only one vertical row of preform cavities 16. In this arrangement the number of preform cavities 16 would preferably be even, so that half of them will correspond to blow cavities 18 on one side of the row of preform cavities 16 and the other half will correspond to blow cavities 18 on the other sides In the first variant illustrated in FIG. 2(a) with eight preform cavities, preforms from cavities 1, 3, 5 and 7 will be transferred to the corresponding blow cavities on one side and preforms from cavities 2, 4, 6 and 8 will be transferred to the corresponding blow cavities on the other side. In this first variant of this cavity arrangement (one row of preform cavities), the distance between preform cavities is typically but not necessarily, half of the distance between blow cavities, so that during preform transfer the distance between preforms need not be changed. The second variant illustrated in FIG. 2(b) is similar to the first variant, but with the blow cavities 18 arranged at slightly different heights in order to be aligned with their corresponding preform cavities 16 for easier preform transfer. The first and second variants of this cavity arrangement may be convenient to use when the container's body diameter is large in relation to the neck diameter, or when the height of the container is large.

In the third variant illustrated in FIG. 2(c) with six preform cavities 16, preforms from the top three cavities numbered 1, 2 and 3 will be transferred to the corresponding blow cavities 18 on one side and preforms from the bottom three cavities numbered 4, 5 and 6 will be transferred to the corresponding blow cavities 18 on the other side of the preform cavities 16. In this third variant the distance between preform cavities 16 would typically, but not necessarily, be equal to the distance between blow cavities 18, to facilitate preform transfer. This third variant would be well suited for the production of containers with large diameter necks.

FIGS. 3(a) and (b) illustrate another preferred cavity arrangement with four rows of preform cavities 16, and two rows of blow cavities 18 on either side of the preform cavities 16, stacked side by side as illustrated in FIG. 3(b), with all the container necks being on the edge of the mould set facing outside, as in the previous two cavity arrangements. This cavity arrangement is best suited for use for small size containers or when higher production rates are required. In this arrangement the parting lines 17 of the preform cavities 16 are parallel with the parting lines 19 of the blow cavities 18, and the mould-separation direction is the same for all the mould cavities. Here a separate mechanism (not shown) coordinates opening of both of the rows of blow cavities 18 on either side of the preform cavities 16.

Figure 4A:
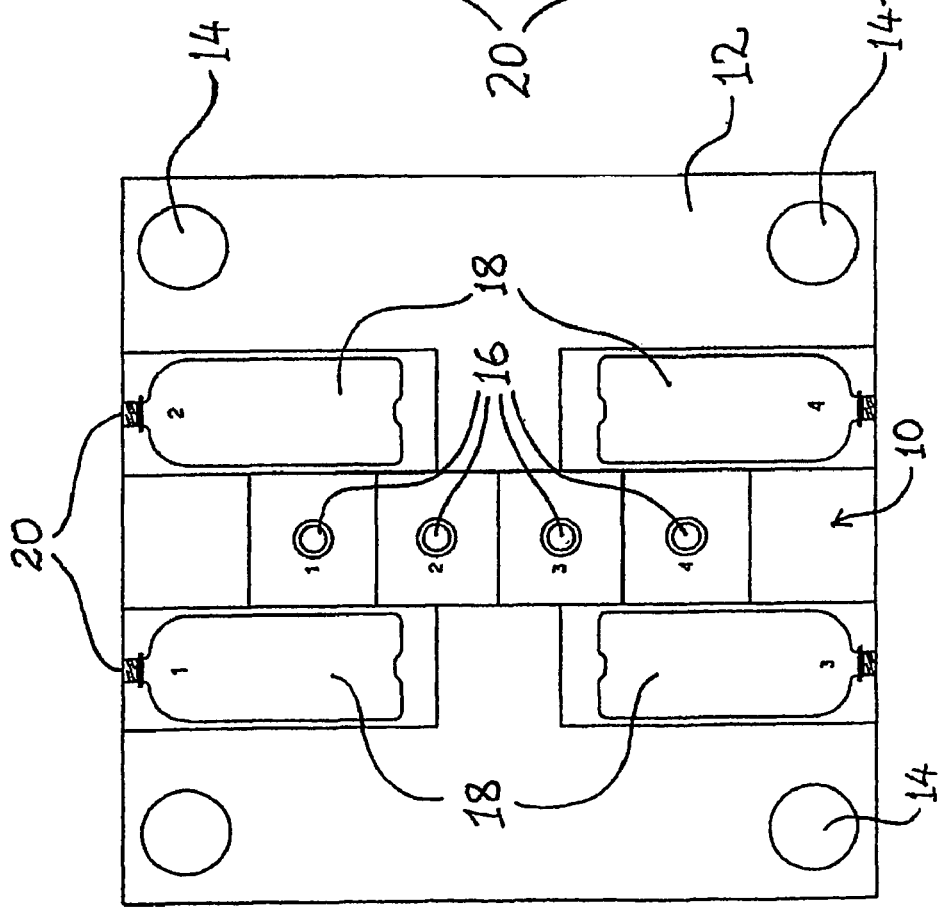

Two variants of a further possible cavity arrangement, specifically for four preform cavities and four blow cavities are illustrated in FIG. 4. In the first case, illustrated in FIG. 4(a) the row of preform cavities 16 remains vertical, but the blow cavities 18 are arranged vertically instead of horizontally, so that the stretch rods would have to enter the cavities from above and from below (not from the sides). In the second case, illustrated in FIG. 4(b) the preform cavities 16 are arranged horizontally instead of vertically and the blow cavities 18 are in a horizontal arrangement. The arrangements illustrated in FIG. 4 would be useful for relatively low production rates when only a few cavities are needed, and for large (above 2 liters) and tall containers.

Figure 5:
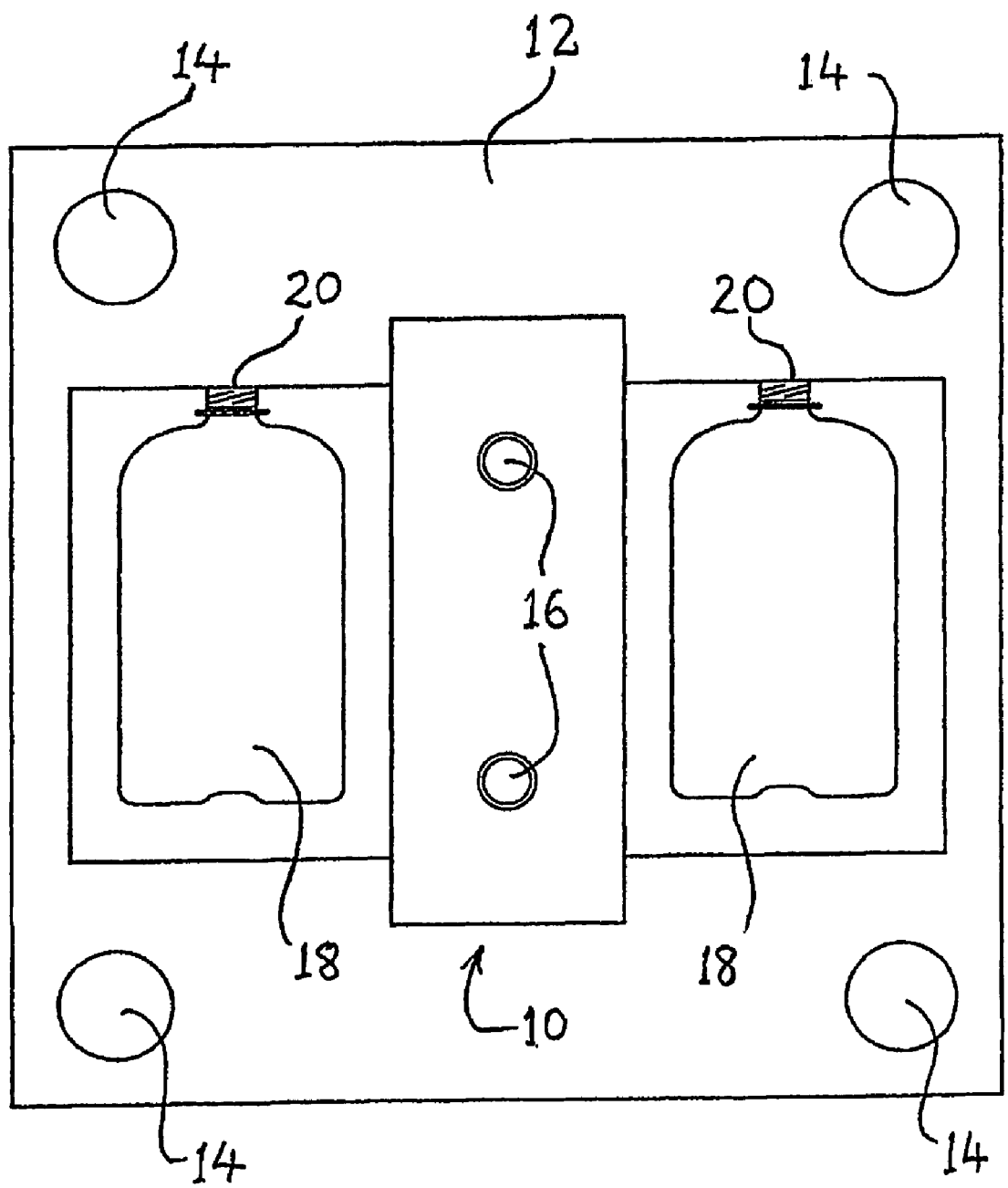

FIG. 5 illustrates one further possible cavity arrangement, specifically for two preform cavities and two blow cavities, which may be particularly useful for low production rates or for large container sizes. In the example illustrated in FIG. 5, two injection cavities 16 are placed centrally in the clamping plates one vertically above the other, while the blow cavities 18 are one on either side of the preform cavities 16 and oriented vertically so that the stretching and blowing means can engage the preform necks from above. Alternatively the cavities could be placed with horizontal rather than vertical orientations.

The five possible cavity arrangements described above are only examples of cavity arrangements that can be used with the present invention. They all have the cavities arranged within the clamping unit of a normal injection-moulding machine, with the axes of the preform cavities being perpendicular to the clamping plates and the axes of the blow cavities being parallel with the clamping plates such that all preform cavities as well as blow cavities open and close simultaneously with the movement of the moving clamping plate, as they share common mould opening and closing directions. Further, in all cases, the cavities may be mounted to the clamping plates all together or some cavities (e.g. blow cavities) may be mounted separately from other cavities (e.g. preform cavities).

When applying the present invention using any one of the cavity arrangements illustrated in FIGS. 1-5 or any other cavity arrangement of this invention, various ways can be used to remove the ready containers from the composite mould set and to transfer the preforms from the injection cavities to the blow cavities. Persons familiar with the art of stretch blow moulding, and/or automation and/or robotics could design mechanisms to achieve these movements in a variety of ways. By way of example only, several possible ways of removing the ready containers and transferring the preforms from the injection cavities to the blow cavities are described below, with reference to FIGS. 6 to 13. The descriptions are based on a cavity configuration with two rows of preform cavities as illustrated in FIG. 1 by way of example, but they can be applied wholly or partly to any cavity configuration in accordance with this invention.

Figure 6A:
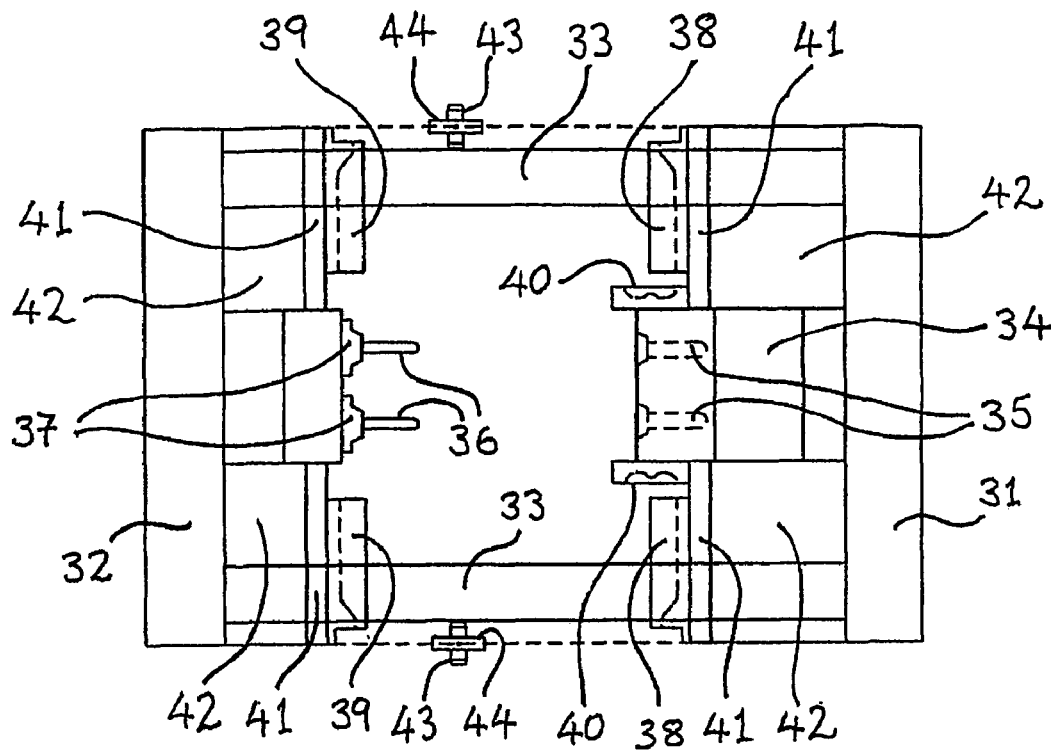
FIGS. 6(a) and 6(b) are plan and elevation views respectively of the main components of a composite injection-blow mould set in accordance with this invention, showing it in an open position.
Figure 6B:
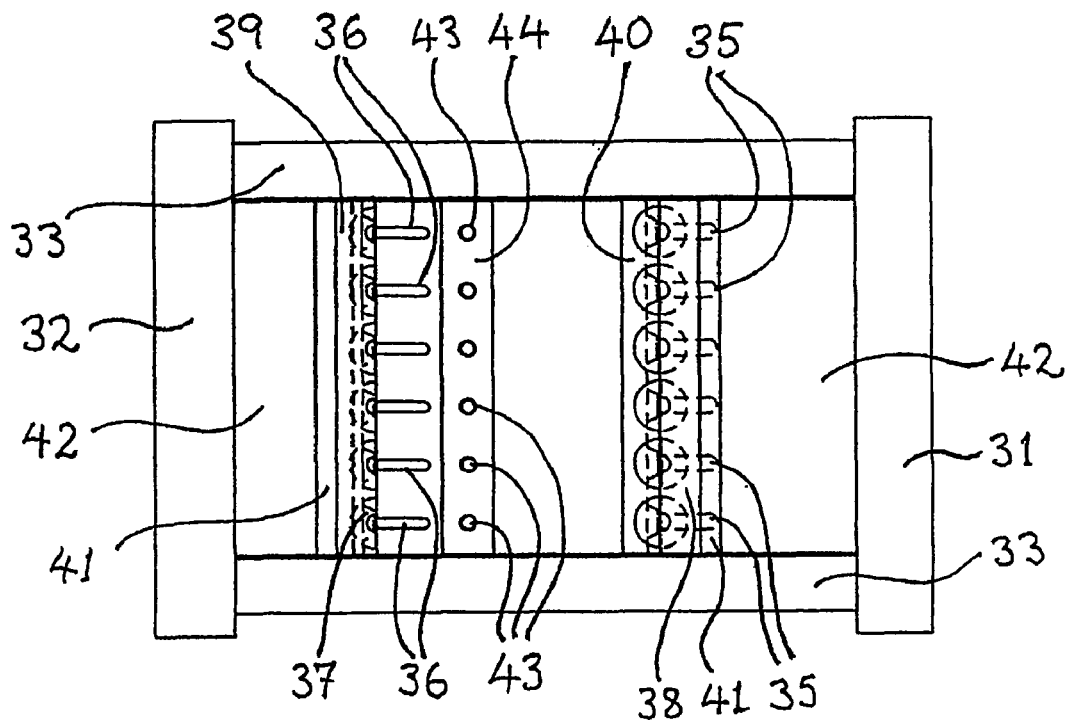

FIG. 6 illustrates the main components of a composite mould set with the cavity arrangement of FIG. 1 (two rows of preform cavities), showing the mould set in a plan view (FIG. 6(a)) and a side view (FIG. 6(b)) in the open position. Some mould components are fixed to the stationary plate 31 of the clamping unit while other components are fixed to the moving plate 32 of the clamping unit. Four tie bars 33 usually guide the movement of the moving plate 32 of the clamping unit. The injection mould part of the composite mould set is similar to the injection moulds used in the related art. A hot runner plate 34 distributes the plastic material to the cavities and keeps it molten at a high temperature, ready to be injected in the next cycle. An array of female cavities 35 is provided with channels around them for circulating a fluid to bring the preform temperature to the desired level. A complementary array of male cores 36 that co-operate with the female cavities 35, can also have fluid circulating through them for temperature control. An array of neck formers 37 is arranged in two vertical rows, each surrounding a male core with each row of neck formers 37 forming a single unit, which is able to move independently in order to deliver the preforms it is holding to a certain position and which also is able to open in order to release the preforms. Neck formers 37 can also have fluid circulating through them for temperature control.

The movements of the neck formers 37 (both lateral and rotary) are achieved in one embodiment by the opening movement of the clamping unit or of the machine ejector, and/or by mechanisms and actuators incorporated in the mould set or mounted on the machine or on a support structure. This arrangement in which the single set of neck formers move away from their positions in the injection mould and then return in time for the next cycle is in marked contrast to the prior art. In the case of the 'two stage' prior art processes, the neck formers do not move away from their positions except for opening to release the preforms. In the case of the 'one stage' prior art processes the neck formers move away and do not return for the next cycle, but are replaced by another set of neck formers.

On either side of the injection mould is a row of blow cavities, consisting of one set of body halves 38 fixed on the side of the fixed plate 31, one set of body halves 39 fixed on the side of the moving plate 32 and one row of base cavities 40. Each of the two rows of base cavities 40 can have fluid circulating through it for cooling and also has the possibility to move away from the blow mould body halves 38 and 39 to release the bottom of the containers for container removal. All the blow mould body halves 38 and 39 are cooled by circulating fluid, either in the body halves themselves or in the blow mould supporting plates 41. The blow mould supporting plates 41 are themselves supported by spacer plates 42, to cover the space between the blow moulds 38/39 and the clamp plates 31/32. This space exists because usually the mould thickness of the injection mould 34-37 is bigger than that of the blow moulds 38/39.

In the example of the composite mould set illustrated in FIG. 6 there are two sets of neck holders 43, each set being attached on a neck holder plate 44, which can move to facilitate the container removal and the preform transfer. For each blow cavity there are two neck holders 43, each on opposite sides of the neck holder plate 44 that holds them. When the mould set is in its closed position, the neck holder on the inside of the mould is operable to hold and form a seal with the inside of the neck of the preform to be stretch-blown into the container, while the neck holder on the outside of the mould is operable to form a seal with the mechanism which supplies blowing air, namely the blow core. The movements of the neck holder plate 44 (both lateral and rotary) are preferably achieved by the opening and closing movements of the clamping unit and of the machine ejector but could also be achieved by mechanisms and actuators incorporated in the mould set or mounted on the machine or on a supporting structure.

The composite mould set illustrated in FIG. 6 is intended for use in preform transfer methods that have only one set of neck formers 37 (Type 1 preform transfer methods). In the case of Type 2 preform transfer methods where there may be two or more sets of neck formers 37, the neck holders 43 and the neck holder plates 44 in FIG. 6 would be replaced by an additional set of neck formers 37.

For illustration purposes, the containers shown in the drawings are bottles, but the present invention can be used for the production of hollow containers in general, including bottles, jars, cups and pails. Also a variety of plastic raw materials can be used, including PET, PEN, Polypropylene, Polystyrene, Polycarbonate, etc.

The possible operation of one embodiment of the composite mould set used in the one example of the present invention is illustrated in FIG. 7, which shows several plan views of the composite mould set at various stages during a production cycle. Similar parts to those in the embodiment of FIG. 6 are given similar reference numerals and will not be described again.

FIG. 7(a) shows the mould set in closed position. While in this position the following operations take place. The injection unit of the injection moulding machine, injects molten plastic material into the injection cavities 35 of the mould, via the hot runner plate 34. The fluid circulating in the cores 36 and cavities 35 of the injection mould bring these just injected preforms to the desired temperature for stretch-blowing in the next cycle. The stretching and blowing mechanism 28 shown schematically in dotted lines moves into place, and the blow cores 45 engage with the empty preform holders 43 making an airtight seal and the stretch rods 51 start stretching the preforms that were injected in the previous cycle and are now in the stretch-blowing position in the blow cavities. While the stretching takes place, as well as after its completion, air is blown into the preforms via the blow cores 45 to blow them against the blow mould cavity 38-40 so that they take the correct container shape. The cooling fluid circulating in the blow cavities or the blow cavity support plates 41 cools the containers that have been just blown. The air is then released from the blow cavities via the blow cores 45, the stretch rods 51 retract and the stretching and blowing mechanism 28 moves out. Thereafter, the container base cavities 40 can move out to release the bottom of the containers so that the containers can move freely out of the blow mould when the mould set opens.

The stretching and blowing mechanism 28 is shown only in FIGS. 7(a) and (d), but for clarity it was omitted from FIGS. 7(b), (c), (e) and (f). In the operation of this embodiment of the present invention, the stretching and blowing mechanism 28 does not move with the opening and closing of the mould, but is stationary and can be fixed to the machine and/or the mould and/or a support structure.

At the end of the 'mould closed' phase of the production cycle (just prior to the point when the mould set starts to open), there are preforms 30 in the injection cavities 35,36 at a suitable temperature ready to be transferred to the blow cavities for stretch-blowing and there are finished containers 26 in the blow cavities 38-40 ready to be removed.

FIG. 7(b) shows the mould set in a partially open position during the mould opening phase. During this early part of the mould opening phase the neck formers 37 and the neck holders 43 move away from the fixed clamp plate 31, but do not follow exactly the movement of the moving clamp plate (unlike other mould components like the injection cores 36). The neck formers 37 and the neck holders 43 move parallel to the movement of the moving clamp plate 32, but they are moved only partially out, so that they remain in the open space between the fixed and moving mould set parts. This is needed in order to facilitate the preform transfer and the container removal movements. At this position the containers are out of the blow mould halves 38-39 and the preforms 30 (still held by the neck formers 37) have cleared both the female cavities 35 and the male cores 36.

FIG. 7(*c*) shows the mould set in a partially open position during (but towards the end of) the mould opening phase. During the movement of the moving clamp plate 32 from the position in FIG. 7(*b*) to that in FIG. 7(*c*) the neck holder plates 44 have rotated and moved further away from the fixed clamp plate 31. This causes the containers 26 to rotate towards the outside of the mould, leaving the area inside the mould free for the preforms 30 to be transferred to their stretch-blow position. At the same time, during the movement of the moving clamp plate 32 from the FIG. 7(*b*) position to the FIG. 7(*c*) position the rows of neck formers 37 have moved further away from the fixed clamp plate 31 while moving also towards the outside of the mould set and rotating, so as to reach a position towards delivering the preforms 30 to the neck holders 43 for stretch-blowing.

FIG. 7(*d*) shows the mould set when it has just reached the fully open position. From the FIG. 7(*c*) position to the FIG. 7(*d*) position, the neck holder plates 44 with the ready containers 26 have continued to move and rotate, so that the containers 26 are outside the mould ready for ejection and the neck holders 43 on the other side of the neck holder plates 44 are facing inside the mould ready to receive the preforms. The combined rotation of the neck holder plates 44 from the start of mould opening until the position of FIG. 7(*d*) is 180 degrees. The rows of neck formers 37 holding the preforms 30 have also continued to move and rotate, so that they are aligned with the neck holders 43 onto which they will deliver the preforms they are holding. The combined rotation of the neck formers 37 from the start of mould opening until the position of FIG. 7(*d*) is 90 degrees. As many of the movements as possible for preform transfer and container removal may be made during the mould opening and closing phases of the production cycle so that the time needed to complete these movements while the mould set is waiting in the open position, and therefore the cycle time, is minimised.

FIG. 7(*e*) shows the mould set in the fully open position just prior to the start of the mould closing phase. The mould set remains open between the positions of FIGS. 7(*d*) and (*e*). During this time the containers 26 must be ejected and the preforms 30 must be transferred from the neck formers 37 to the corresponding neck holders 43. This can be achieved as follows:

a) The neck formers 37 holding the performs 30, and the empty corresponding neck holders 43 move towards each other (or holders towards formers or formers towards holders) until the preforms 30 engage the neck holders 43 and are securely in position.

b) The neck formers 37 open, thus releasing the performs 30.

c) The neck formers 37 and the neck holders 43 move away from each other, in the reverse movement of a) above, leaving the preforms 30 behind on the neck holders 43.

d) The now empty neck formers 37 close and are ready to move back into their injection moulding position.

After the completion of the above set of movements, the position is as shown in FIG. 7(*e*) and the mould closing phase can start.

FIG. 7(*f*) shows the mould set in a partially closed position during the mould closing phase. This position corresponds with the position of FIG. 7(*b*), but instead of being during mould opening it is during mould closing. During the mould closing phase, the neck formers 37 follow the same movements that they followed during the mould opening phase, but in reverse, including the 90 degrees rotation. During the mould closing phase, the neck holder plates 44 also follow the same movements that they followed during the mould opening phase but in reverse, except the 180 degrees rotation. The mechanism that rotated the neck holder plates 44 through 180 degrees during mould opening is de-activated during mould closing, so that the preform holder plates 44 with the preforms 30 on them are not rotated but only move laterally and end up in the correct position for stretch-blowing when the mould set is closed.

After the position of FIG. 7(*f*), the mould set continues closing until it reaches the position shown in FIG. 7(*a*), with the injection cavities empty and the preforms in the blow moulds ready for stretch-blowing. The next production cycle can then start.

There are several variants of the operation of the preferred embodiment just described which uses just one set of neck formers (the number of neck formers here being equal to the number of injection mould cavities and the number of blow mould cavities). These variants utilise different ways of transferring the preforms from the injection to the stretch-blow positions and of removing the finished containers.

FIG. 8 illustrates the operation of such a variant, in which there are no preform holders 43, but instead the blow cores 45 are shaped in such a way, that they can hold the preforms 30 in a similar way as the preform holders 43. In this variant, the stretch blowing mechanism has to move during mould opening and closing so that it remains aligned with the neck formers, in order to facilitate preform transfer. Additionally in this variant the removal of the ready containers 26 is achieved by an independent container removal mechanism (not shown), as it may not be convenient to move the blow cores 45 away from the mould set in order to remove the containers 26.

FIG. 8(*a*) shows the mould set in closed position, for the injection moulding of new preforms and the stretch blowing of the preforms moulded in the previous cycle into containers 26. FIG. 8(*b*) illustrates the mould set in a partially open position during the mould opening phase. During this phase and/or during part of the time that the mould set remains open, an independent container removal mechanism (not shown) moves in, grips the containers 26 from their necks, removes them from the blow cores 45 and moves them away from the mould set. In FIG. 8(*b*) the arrows indicate one possible path that the containers 26 may follow while being removed by the independent container removal mechanism. Also during this part of the mould opening phase, the neck formers 37 and the blow cores 45 move away from the fixed clamp plate 31 as well as from the stationary clamp plate 32, so that they remain in the open space between the fixed and moving mould set parts.

FIG. 8(*c*) illustrates the mould set in a partially open position towards the end of the mould opening phase. The ready containers 26 may have already been removed from the blow cores 45 at this stage, while the rows of neck formers 37 have moved and rotated, so as to reach a position towards delivering the preforms 30 to the blow cores 45 for stretch blowing in the next cycle.

FIG. 8(*d*) shows the mould set when it has just reached the fully open position. At this position the neck formers 37 holding the preforms 30 have continued to move and rotate, so that they are aligned with the blow cores 45 onto which they will deliver the preforms 30 they are holding. The blow cores 45 and, therefore, the stretching and blowing mechanism 28 must remain aligned with the neck formers 37, so the stretching and blowing mechanism 28 moves during mould opening in a similar movement to that of the neck formers.

This is in contrast with the previous variant described and illustrated in FIG. 7, in which the stretching and blowing mechanism was stationary.

Figure 8A:
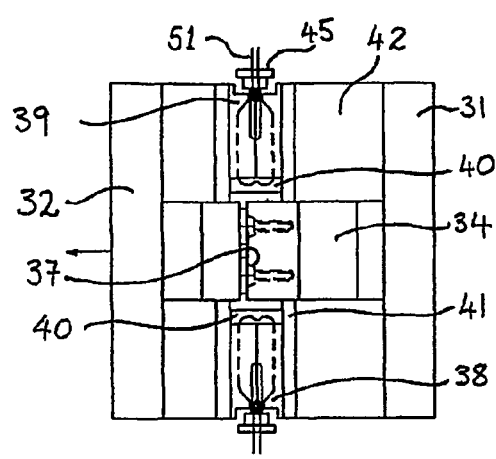
Figure 8D:
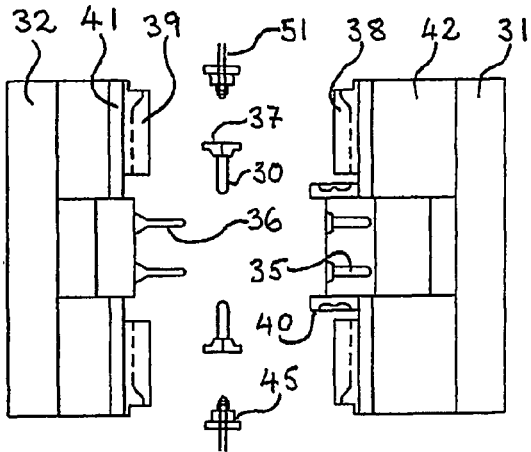
Figure 8B:
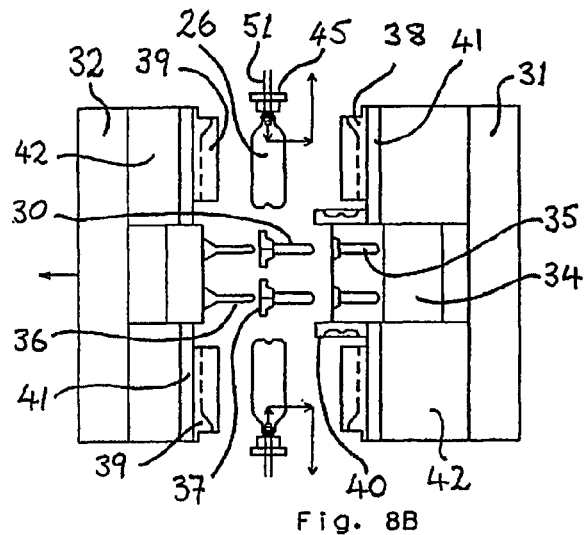
Figure 8E:
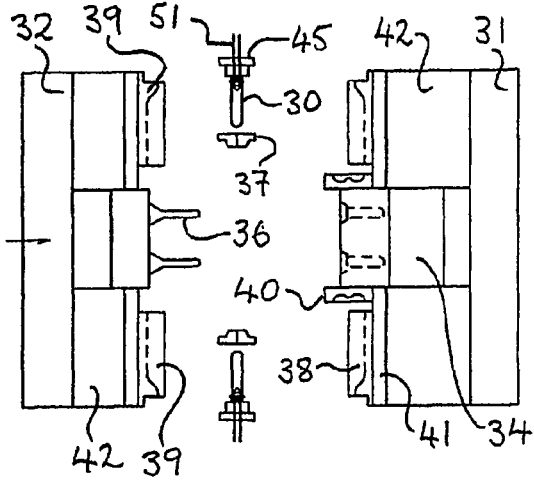
Figure 8C:
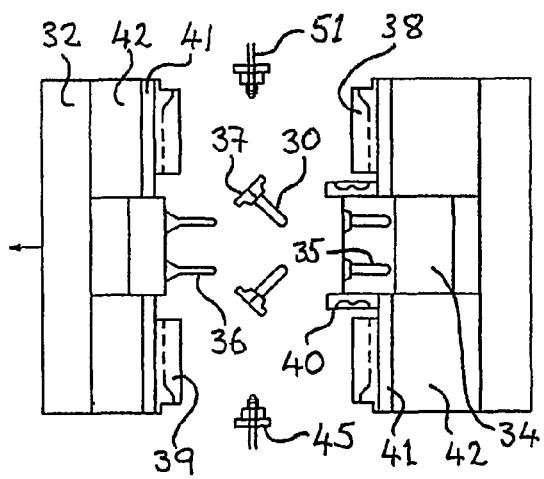

FIG. 8(e) shows the mould set in the fully open position just prior to the start of the mould closing phase. In the time interval between FIG. 8(d) and FIG. 8(e) the mould set remains open and the preforms 30 are transferred from the neck formers 37 to the blow cores 45. This is achieved in a similar manner as described for the transfer of preforms 30 from the neck formers 37 to the preform holders 43 in the earlier variant (FIG. 7) of this embodiment of the present invention.

Figure 8F:
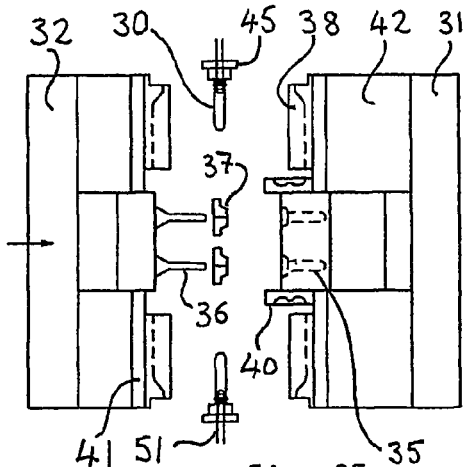

FIG. 8(f) shows the mould set in a partially closed position during the mould closing phase, with the blow cores 45 holding the preforms 30 so that when the mould set reaches the fully closed position the preforms will be at the correct location for stretch blowing.

FIG. 9 illustrates the operation of a variant in which the way that the neck holders 43 move to remove the finished containers 26 and take hold of the new preforms 30 is the same as in the operation of the preferred embodiment just described, but the preforms 30 are moved away from the injection mould 35,36 by a robot arm 46. Having a robot arm 46 that takes the preforms from their injection cores and neck formers and delivers them to the neck holders, allows the temperature of the performs 30 to be further conditioned while in the robot arm 46. This conditioning can be achieved, for example, by air of a certain temperature being sucked or blown through the robot arm along the outside surface of the preforms. The use of a robot arm 46 also allows neck grips to be used instead of neck holders. Neck grips hold the preform from the outside of the neck rather than from the inside, so that they can grip the neck firmly around the screw threads, providing another way of eliminating the need for a neck ring (support ring). Neck grips used in cases when a neck ring is present, can have a simpler shape in the neck grip area, without the screw threads.

FIG. 9 shows six plan views at various stages during the production cycle. There is no illustration for the mould set in the closed position, but FIG. 9(a) shows the mould set in a partially open position during the opening phase, where the preforms 30 remain on the injection cores 36 (unlike the preferred embodiment described earlier—see FIGS. 7(b) and (c)), waiting for the robot arm 46 to come into position.

Figure 9A:
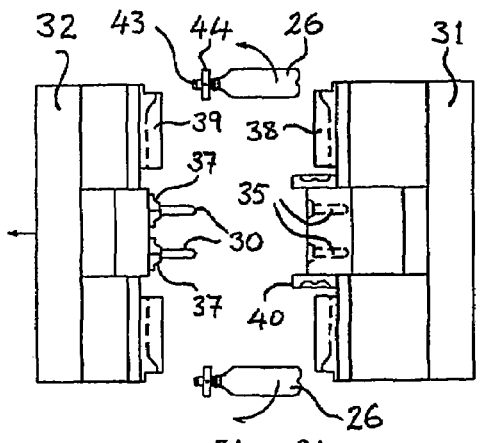
Figure 9D:
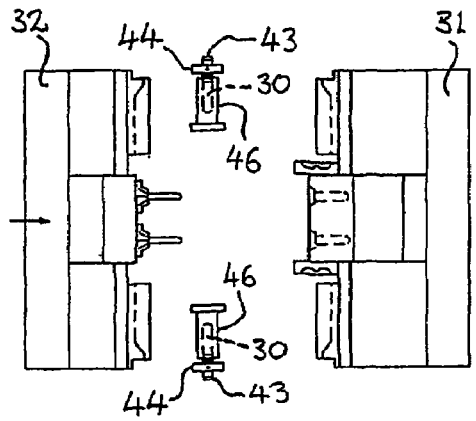
Figure 9B:
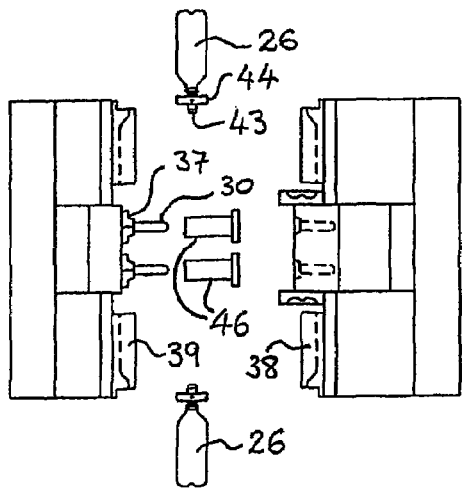
Figure 9E:
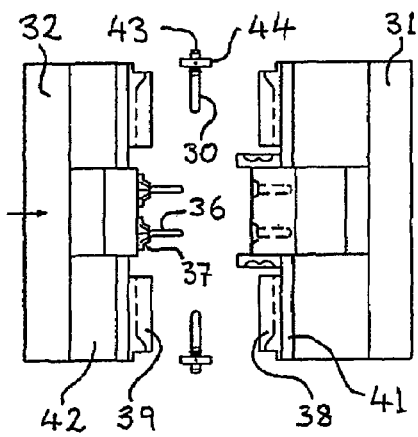
Figure 9C:
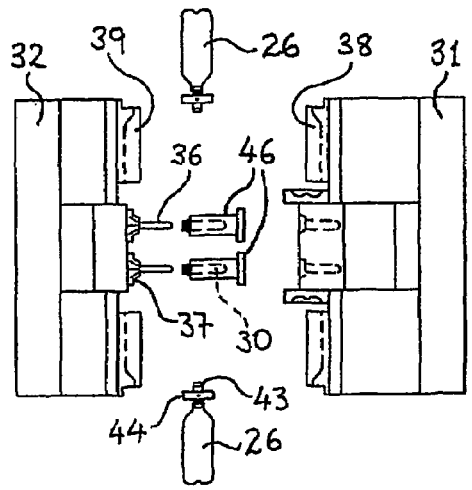

FIG. 9(b) illustrates the mould set in fully open position, with the robot arm 46 in place ready to accept the performs 30. The robot arm 46 can move into the position shown from above and to save time it can start moving even before the mould set has reached the fully open position. FIG. 9(c) shows the mould set in the same position as FIG. 6(b), but the preforms 30 are now in the robot arm 46. In the time interval between FIGS. 9(b) and (c), the neck formers 37 are moved forward (preferably by the ejector of the machine) pushing the preforms 30 off the cores 36 and into the robot arm 46. Simultaneously the neck formers 37 open to release the preforms 30 and then they close and move back to their original position.

FIG. 9(d) illustrates the mould set in a fully open position, with the robot arms having moved to deliver the preforms to the neck holders. Once the preforms 30 are delivered securely on the neck holders 43, the robot arms 46 move away from the neck holders 43 and out of the mould set, so that the closing phase can start. FIG. 9(e) shows the mould set partially closed during the closing phase, after the robot arm 46 has moved out.

Figure 9F:
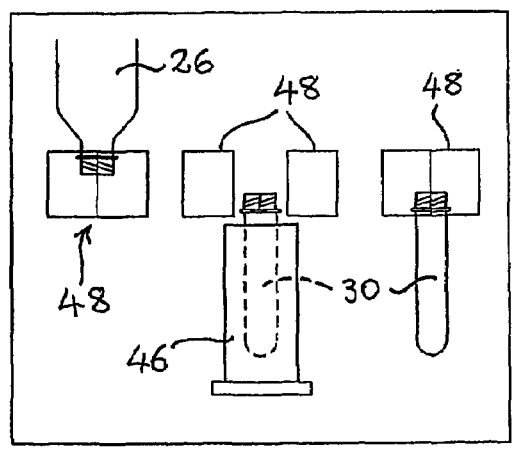

The alternative of using neck grips 48 instead of neck holders 43 is illustrated in FIG. 9(f). The operation sequence is the same, except the method by which the preforms 30 are transferred from the robot arms 46 to the neck holders/grips 48. The grips 48 are designed to open in order to release the necks, in a way similar to the neck formers 37. During the time interval between FIGS. 9(c) and (d), the neck grips 48 open in order to release the ready containers 26 and also to be ready to receive the new set of performs 30. The position shown in FIG. 9(d) corresponds to the middle illustration of FIG. 9(f), when the robot arm 46 has moved the preforms 30 to the neck grips 48. The neck grips will then close to take hold of the preforms and the robot arm will move out.

In another variant of the operation of the preferred embodiment described earlier (with one set of neck formers 37), the way that the preforms 30 are moved away from the injection mould can be one of the ones already described, but the way that the neck holders 43 move to remove the finished containers 26 and take hold of the new preforms 30 is achieved in a different way as illustrated in FIG. 10. Rather than having one neck holder plate 44 on either side of the mould, with each neck holder plate 44 having two sets of neck holders 43 (one set on each side of the plate), there are two neck holder plates 44a, 44b on either side of the mould, each neck holder plate 44 having one set of neck holders 43. The one neck holder plate 44a removes the finished containers 26, ejects them and takes position ready for the next cycle, while the other neck holder plate 44b, which is waiting from the previous cycle, takes the new set of performs 30. In this way the neck holder plate 44a that removes the finished containers 26, has ample time to take the containers 26 and deliver them either to a transport conveyor or to a position for further processing (e.g. filling).

FIG. 10 illustrates this variant by showing six plan views at various stages of the production cycle. The preforms 30 in this case are moved to the neck holders 43 by the neck formers 37, but they could be moved by robot arm 46 if preferred. FIG. 10(a) illustrates the mould set in the closed position, while FIG. 10(b) shows the mould set in a partially open position during the opening phase.

Figure 10A:
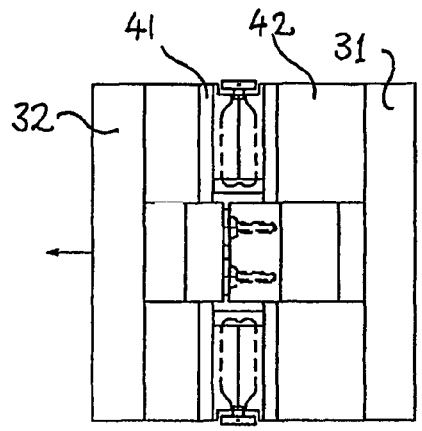
Figure 10D:
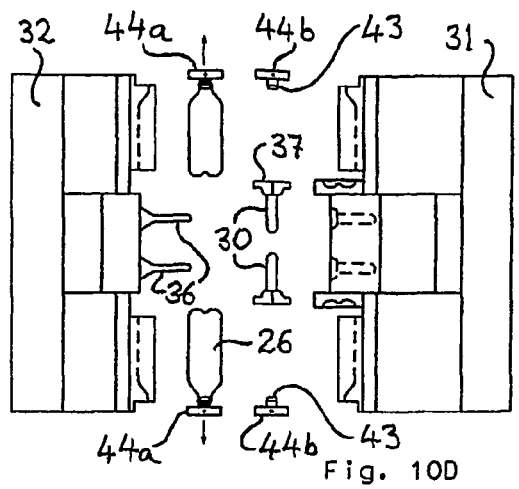
Figure 10B:
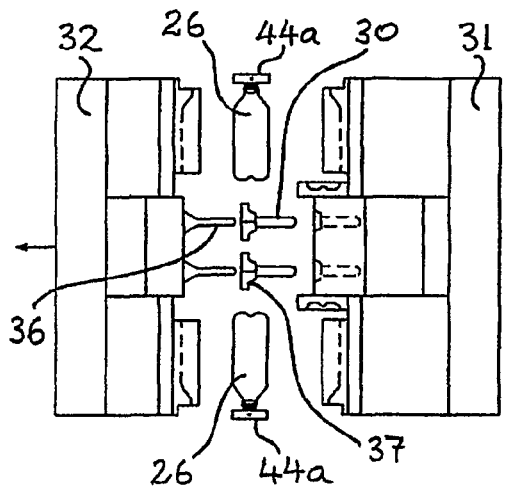
Figure 10E:
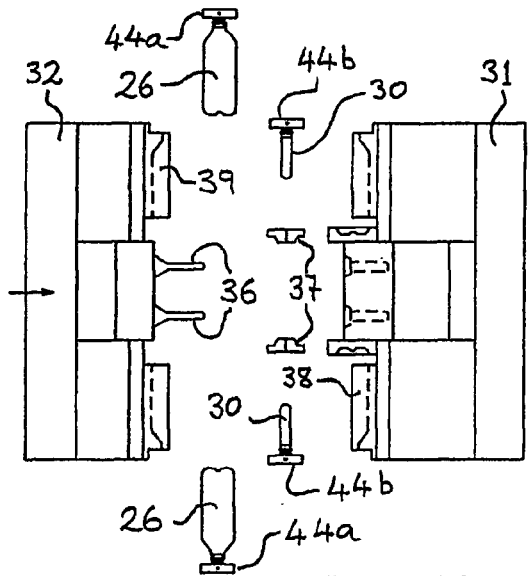
Figure 10C:
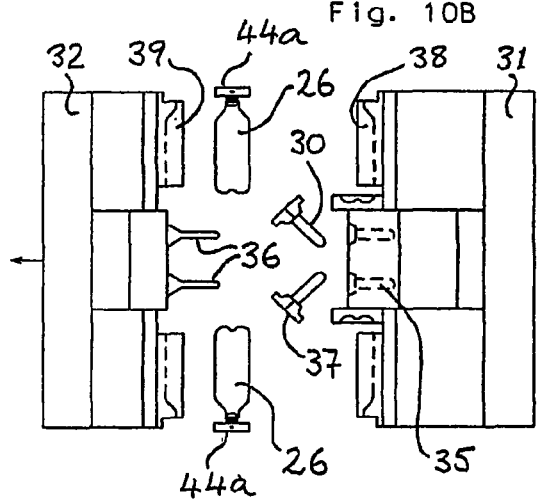

FIG. 10(c) illustrates that in this variant the neck holder plate 44a holding the finished containers 26 does not use rotation to remove the containers, but instead only moves laterally. The neck formers 37 in the meantime start to rotate in order to orient the preforms 30 correctly for transfer to the second neck holder plate 44b.

FIG. 10(d) shows the mould set having just reached the fully open position, with the finished containers 26 ready for removal and the neck formers 37 having completed their rotation and in alignment with the neck holders 43 on the second neck holder plate 44b, which have moved in position, ready to take the performs 30 from the neck formers 37.

FIG. 10(e) illustrates the mould set in fully open position just before starting to close. In the time interval between FIGS. 10(d) and (e), the following movements take place:

a) The neck formers 37 holding the preforms 30 and the empty second set of neck holders 43 and neck holder plate 44b move towards each other (or holders towards formers or formers towards holders) until the preforms 30 engage the neck holders 43 and are securely in position.

b) The neck formers 37 open, thus releasing the performs 30.

c) The neck formers 37 and the neck holders 43 move away from each other, in the reverse movement of a) above, leaving the preforms 30 behind on the neck holders 43 d) The now empty neck formers 37 close and are ready to move back into their injection moulding position.

e) Simultaneously with movement c) above the neck holders 43 on the neck holder plate 44a holding the finished containers 26 move out, removing the containers 26.

The movements c) and e) above could be parallel and simultaneous, and so, in such cases they may, be achieved using the same actuator or actuators.

Figure 10F:
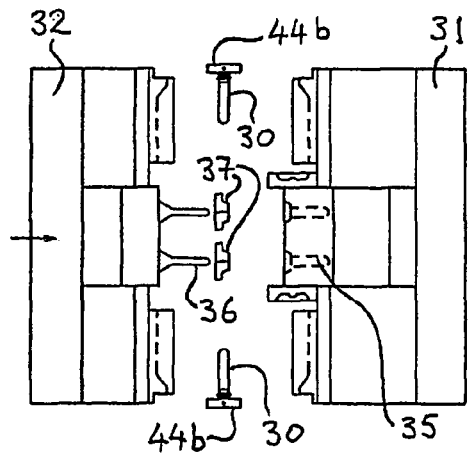

FIG. 10(f) shows the mould set partially closed during the closing phase. During the time interval between FIGS. 10(e) and (f) the neck formers 37 have moved back in position for mould closing, retracing in reverse their movements during mould opening.

Another variant of the embodiment of this invention that has a mould set with one set of neck formers is illustrated in FIG. 11. In this variant, unlike the usual way in preform moulds of prior art, when the mould opens the neck formers 37 (and the preforms 30) do not move, but remain stationary on the cavity side of the mould.

Figure 11A:
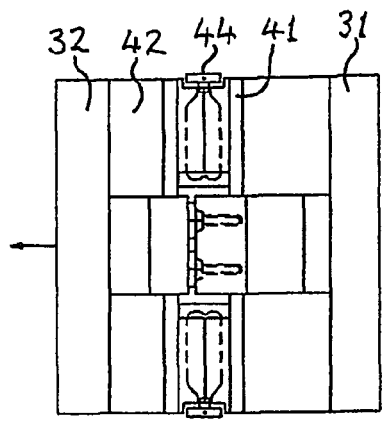
Figure 11D:
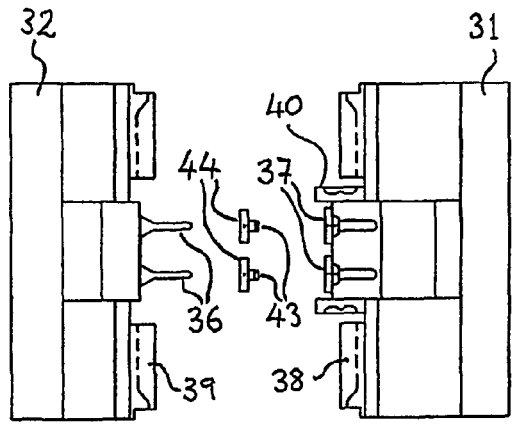
Figure 11B:
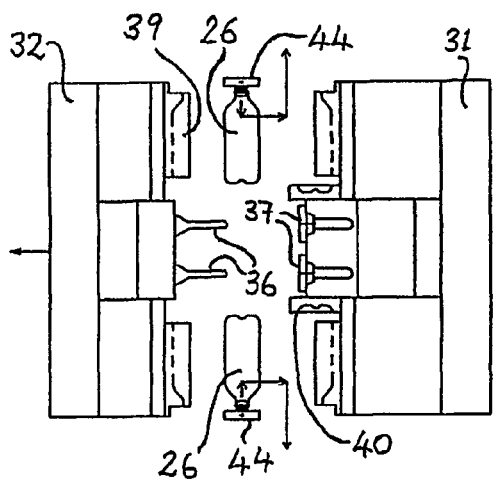

FIG. 11(a) shows the mould set in closed position, while FIG. 11(b) illustrates the mould set in a partially open position during the mould opening phase. During this phase and/or during part of the time that the mould set remains open, an independent container removal mechanism (not shown) moves in, grips the containers 26 from their necks, removes them from the preform holders 43 and moves them away from the mould set. In FIG. 11(b) the arrows indicate one possible path that the containers 26 may follow while being removed by the independent container removal mechanism.

Figure 11E:
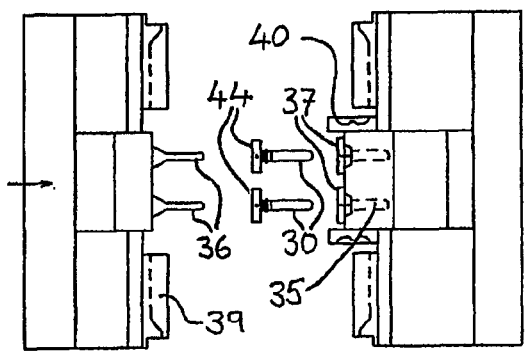
Figure 11C:
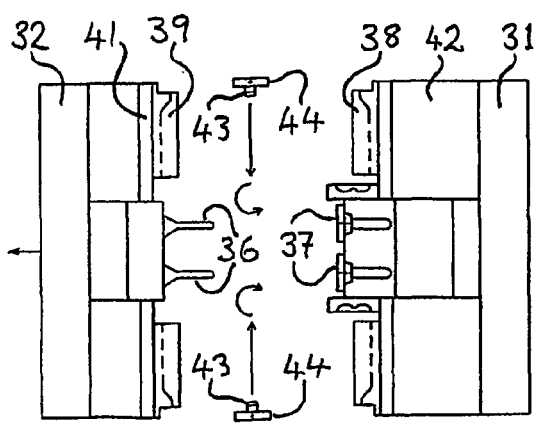

FIG. 11(c) illustrates the mould set in a partially open position towards the end of the mould opening phase, showing that the neck formers 37 are on the cavity side of the mould set, not having moved during mould opening. The ready containers 26 have been removed from the preform holders 43, which will move inside the mould and rotate through 90 degrees as illustrated by the arrows. This movement of the preform holders 43 takes them to a convenient location for taking hold of the preforms 30 that were just injection moulded, as is illustrated by FIG. 11(d) which shows the mould set in the open position.

FIG. 11(e) shows the mould set in the fully open position just prior to the start of the mould closing phase. In the time interval between FIG. 11(d) and FIG. 11(e) the mould set remains open and the preforms 30 are transferred from the neck formers 37 to the preform holders 43. This is achieved in a similar manner as described for the transfer of preforms 30 from neck formers 37 to preform holders 43 in earlier variants of this embodiment of the present invention.

Figure 11F:
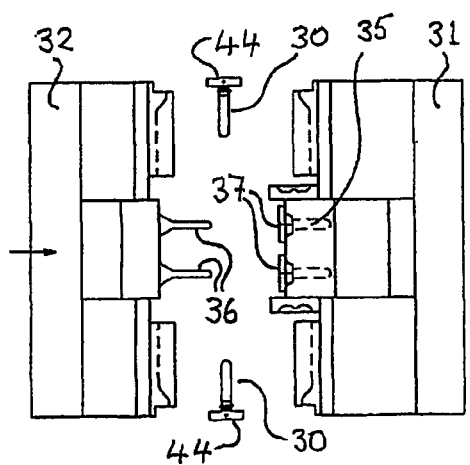

FIG. 11(f) shows the mould set in a partially closed position during the mould closing phase, with the preform holders 43 holding the preforms 30 having moved to their location at the edge of the mould set. In this way, when the mould set reaches the fully closed position the preforms will be at the correct location for stretch blowing.

Another variant of the embodiment of this invention that has a mould set with one set of neck formers is illustrated in FIG. 12. In this variant, there is one common mechanism 50 for moving the stretch rods 51, removing the finished containers 26 and transferring the preforms 30 from the neck formers 37 to the neck holders 43.

Figure 12A:
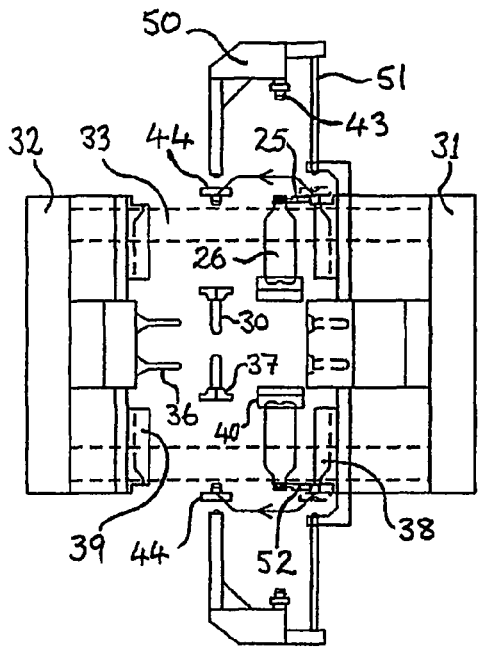

FIG. 12(a) shows the mould set in the open position, just having finished its opening phase. The following movements are carried out during the opening phase in order to reach the position illustrated in FIG. 12(a):

a) The blow mould bottom cavities 40 move away from the fixed clamp plate in a movement parallel to that of the moving clamp plate 32 (instead of staying with the fixed plate 31 and moving away from the blow mould body halves 38,39).

b) The finished containers 26 follow the same movement as the blow mould bottom cavities 40, clearing the blow mould body halves 38,39.

c) The neck holders 43 that hold the finished containers 26 in the blow mould move away from the fixed clamp plate 31 in a movement parallel to that of the moving clamp plate 32, but at the same time moving outwards. This outward movement releases the containers 30 and also enables the neck holders 43 to move further away from the fixed clamp plate 31 in order to align themselves with the neck formers 37. The arrows in FIG. 12(a) illustrate the path followed by the neck holders 43.

d) A set of container retainers 25 follows the movement of the containers 26, supporting them from the neck so that they do not drop when they are released from the neck holders 43.

e) The neck formers 37 move and rotate by 90 degrees, aligning the preforms 30 with the neck holders that will transfer them to stretch blowing.

Figure 12C:
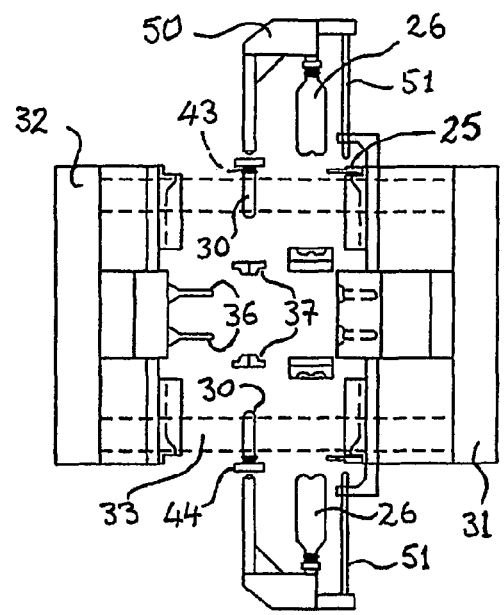
Figure 12B:
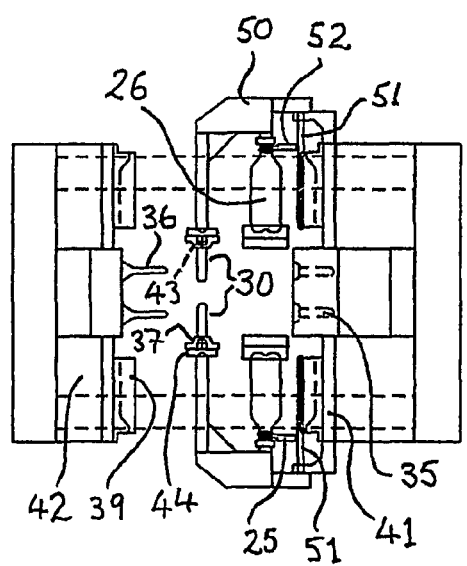

FIG. 12(b) shows the mould set in the open position, with the mechanism 50 having moved inside the open mould set. At this position the neck holders 43 have been pushed into the preform necks and at the same time another set of neck holders 43 that are permanently fixed to the mechanism have been pushed into the necks of the finished containers 26.

FIG. 12(c) illustrates the still open mould set just prior to the start of the closing phase. The mechanism 50 has moved out, carrying with it the finished containers 26 outside the mould and returning the neck holders 43 holding the preforms to their original position ready for stretch blowing after the mould set closes. In the time interval between FIGS. 12(b) and (c), and before the mechanism starts moving out, the neck formers 37 open to release the preforms 30 and also the container retainers 25 retract to free the containers 26 for removal.

Figure 12D:
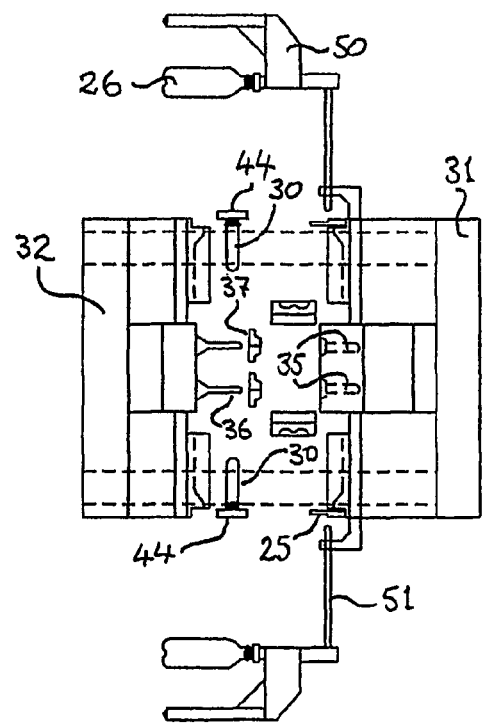

FIG. 12(d) shows the mould set in a partially closed position during the closing phase. During mould closing the mechanism 50 holding the ready containers 26 rotates through 90 degrees, so that the containers can be released and also so that the mechanism will not hit the closed mould during stretch blowing when the stretch rods move in to stretch the preforms.

In all the variants described so far the neck holders 43 or blow cores 45 held the preforms in the stretch blow position and during stretching the preforms 30 were supported on the neck portion of the blow moulds by a neck ring (support ring) incorporated in the preform design. In the cases when the container design does not allow the use of a neck ring (support ring), all the above described variants are still applicable with the following change: the blow moulds incorporate a neck portion with the full neck design (or close to it) including any screw threads, so that when the moulds close around the preforms they will completely enclose the neck with the screw threads, so that in the absence of a neck ring (support ring) the preform will be supported by the screw threads during the stretching.

Most of the variants just described, of the embodiment with two rows of preform cavities, can be also applied to the case when an additional step of preform conditioning is required. In such cases, a conditioning station can be located on either side of the mould set for further temperature conditioning of the preforms between the injection moulding and the stretch blowing. One additional set of preform holders would then be required, so that the preforms just injection moulded would be carried by one set of preform holders to the conditioning station, while the other set of preform holders would carry the conditioned preforms from the conditioning station to the stretch blowing position. The operations of all the mould set variants described so far are for composite mould sets with only one set of neck formers. Another preferred embodiment of the present invention is with a composite mould set that has two sets of neck formers, which interchange positions between injection and blow cavities. The use of this preferred embodiment may be convenient when the container design does not allow the existence of a neck ring (support ring).

One possible operation of this preferred embodiment is illustrated in FIG. 13, which shows plan views of a mould set with two sets of neck formers 37a, 37b, at various stages during the production cycle. FIG. 13(a) illustrates the mould set in closed position and FIG. 13(b) shows the mould set in a partially open position during the opening phase. These Figures show that in this preferred embodiment the neck holder plates 43 are replaced by neck formers 37a.

Figure 13A:
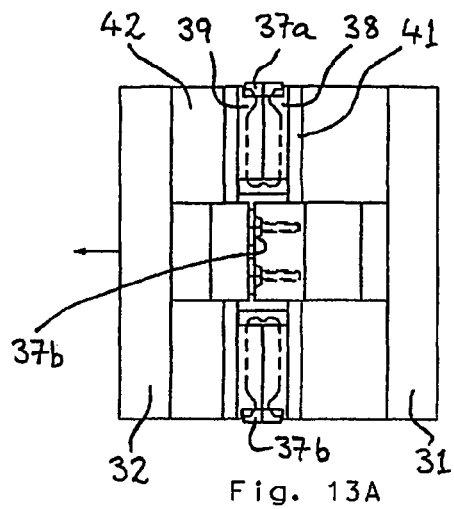
Figure 13D:
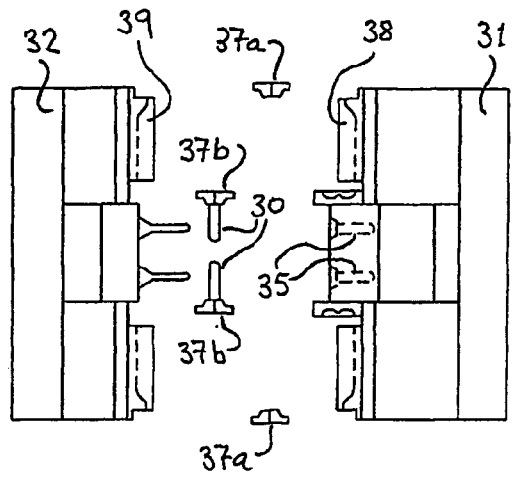
Figure 13B:
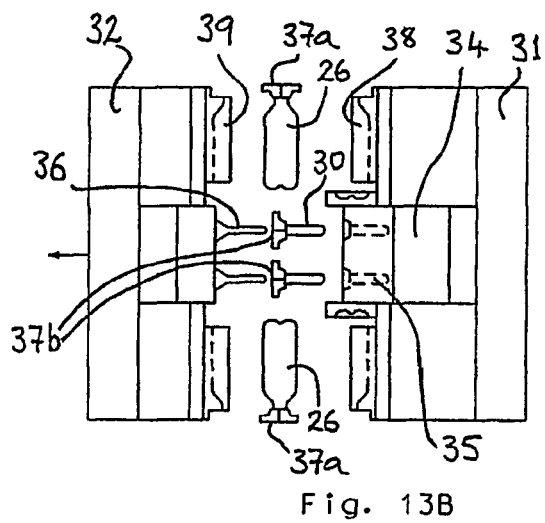
Figure 13E:
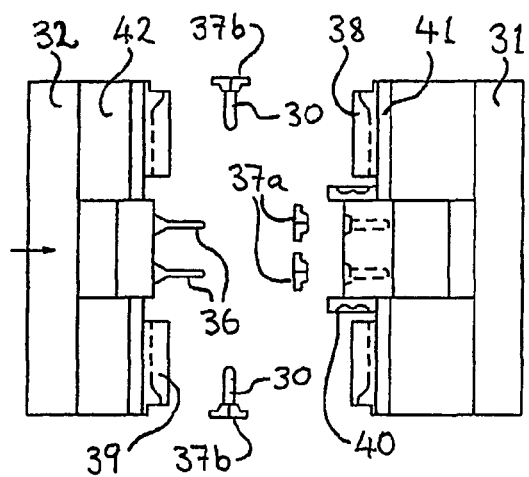
Figure 13C:
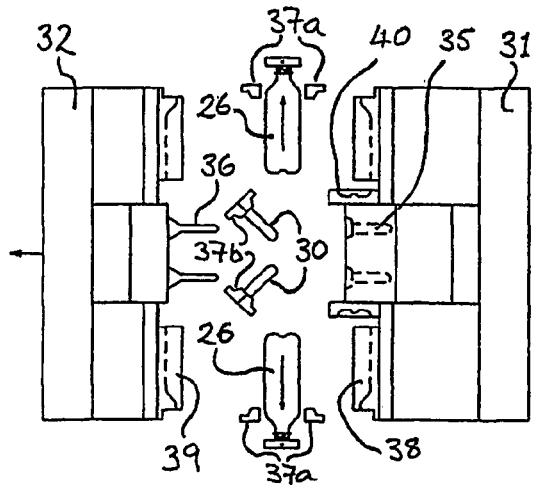

FIG. 13(c) illustrates the mould set in a partially open position during (but towards the end of) the mould opening phase. In the time interval between FIGS. 13(b) and (c), the neck formers 37a holding the finished containers 26 opened and released the finished containers, while the neck formers 37b holding the preforms 30 started rotating to align the preforms 30 for the next cycle. The released finished containers can either be allowed to drop or be removed by independent container removal mechanisms. One possibility is for neck holders 43 to move in from outside the mould, enter the necks of the containers 26 and when the neck formers 37a open, move out in the direction shown by the arrows in the containers in FIG. 13(c), removing the containers. In such a case the opening distance of the neck formers 37a must be large enough to allow the whole container to pass through.

FIG. 13(d) shows the mould set having just reached the fully open position. In the time interval between FIGS. 13(c) and (d), the neck formers 37a that had earlier released the finished containers have closed, while the neck formers 37b holding the preforms 30 have completed their 90-degree rotation.

Figure 13F:
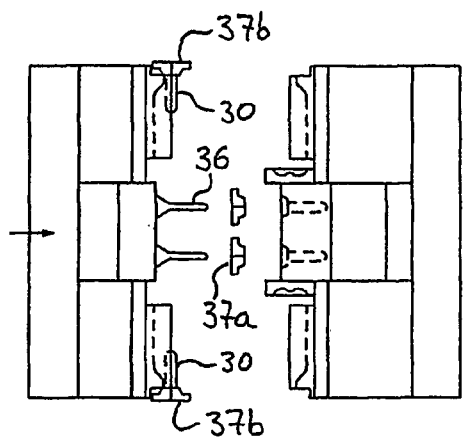

FIG. 13(e) illustrates the mould set in fully open position just before starting to close. In the time interval between FIGS. 13(d) and (e), the empty neck formers 37a moved into the injection mould ready for the next injection cycle, while the neck formers 37b holding the preforms moved outwards, ready for the stretch blow position. FIG. 13(f) shows the mould set partially closed during the closing phase.

In another preferred embodiment, similar to the one whose operation was just described, the mould set has three sets of neck formers 37a, 37b, 37c instead of two. The three sets of neck formers interchange positions between the injection mould, a preform conditioning station just outside the mould and the blow moulds for stretch blowing. This arrangement can be used in cases when preform conditioning after injection moulding and before stretch blowing is deemed desirable.

The described preferred embodiments and their variants present several ways of transferring the preforms from the injection position to the stretch blowing position and removing the finished containers. Although the descriptions were based on a cavity configuration with two rows of preform cavities as illustrated in FIG. 1 by way of example, they can be applied wholly or partly to any cavity configuration in accordance with this invention. Combinations of movements from these described possibilities can also be used to achieve the desired results. Furthermore, in all the above possibilities, the finished containers can be simply ejected, or placed on a transport conveyor, or taken for secondary operations.

For all the variants of possible operation of the mould sets of all the embodiments described, the movements of the neck formers and the neck holders (both lateral and rotary), as well as any other movements needed for preform transfer, container removal and stretching/blowing, can be achieved by any combination of the following: the opening movement of the clamping unit, the movement of the machine ejector, pneumatic and/or hydraulic actuators and electric and/or hydraulic motors. The use of these methods of achieving movements is known to those familiar with the art of mould design and/or machine design and/or automation and/or robotics. The maximum use of mechanical movements as a result of clamp opening/closing and of machine ejector movement is preferred, as these are standard machine movements and would minimise cost, energy consumption and cycle time.

The variants of the operation of the mould sets described have the necks of the containers on the sides of the clamp area so that the stretch rods would have to enter the blow cavities from the sides, however, the necks of the containers could also be placed on the top and/or bottom of the clamp area (with the row or rows of preform cavities placed vertically or horizontally) so that the stretch rods would have to enter the blow cavities from the top and from the bottom.

In all cases mechanisms for the stretching and blowing of the preforms in the blow moulds can be provided. Such mechanisms would be similar to the stretching and blowing mechanisms used in the existing art either in the stretch blow moulding machines of the two-stage process or in the stretch-blowing station of the one-stage process. The design of such mechanisms is known to those familiar with the art of stretch blow moulding.

It should be appreciated that although the combined mould set described in this specification may be used in moulding processes which use a blow-moulding step only, it is envisaged that the mould set will be used primarily in stretch blow-moulding processes which use a stretching step in addition to the blow-moulding.

Furthermore, in addition to the mould set and the injection moulding machine, several mechanisms would be required for operation of the above embodiments, including a container removal mechanism, a preform transfer mechanism and a stretch blowing mechanism. Such mechanisms are commonly used in the prior art machines and the selection and/or design of such mechanisms is well within the competence of one skilled in the art of stretch blow moulding and/or of automation. It is envisaged that such mechanisms in most instances will be part of, within or fixed to the mould set, as well as being fixed to or supported by the tie bars or fixed clamp platen of the injection moulding machine. It will be appreciated, however, that the mechanisms may be mounted on the mould, the injection moulding machine or any other suitable structure.

Out of the various possible cavity arrangements described and illustrated in FIGS. 1 to 5 and the various possible ways of achieving container removal and preform transfer described and illustrated in FIGS. 7 to 13, the operation of one specific embodiment by way of example will now be described, to illustrate the practical application of the present invention. This is based on a two-row cavity arrangement as illustrated in FIG. 1 with a Type 1 preform transfer mechanism (based on one set of neck formers). In this embodiment, the way of transferring preforms from the injection cavities to the stretch blowing position in the blow cavities is similar to the variant illustrated in FIG. 8, i.e. without neck holders.

Figure 14A:
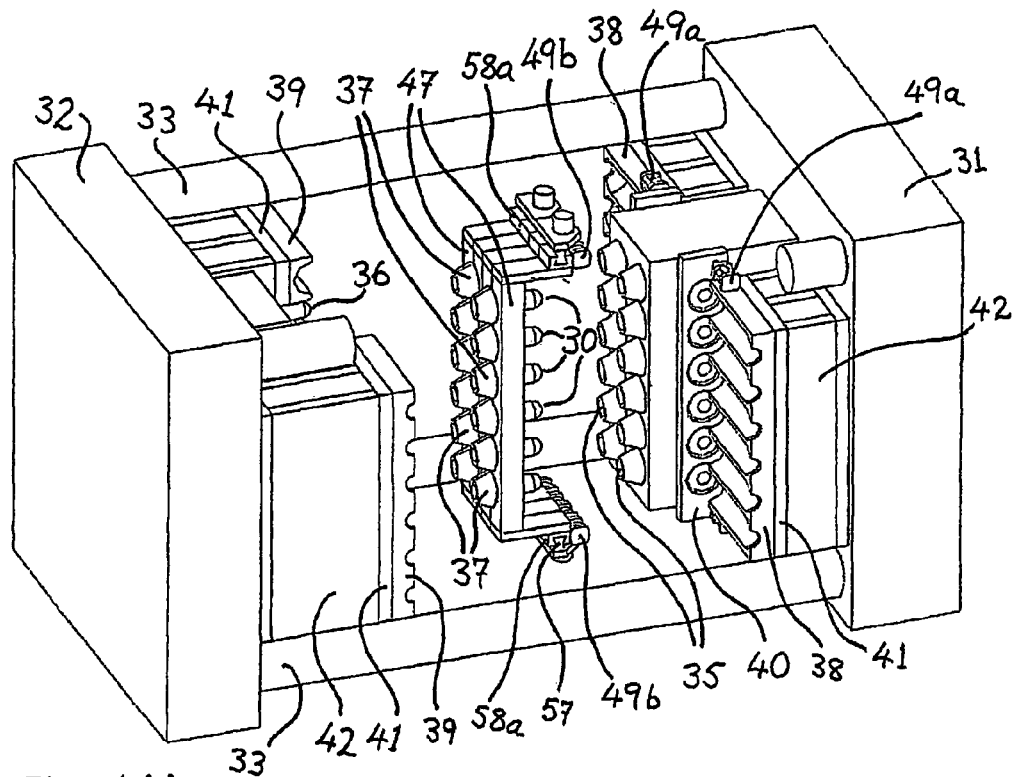
FIGS. 14(a) and 14(b) are respective perspective views of the various parts of the composite mould set when in the open position.
Figure 14B:
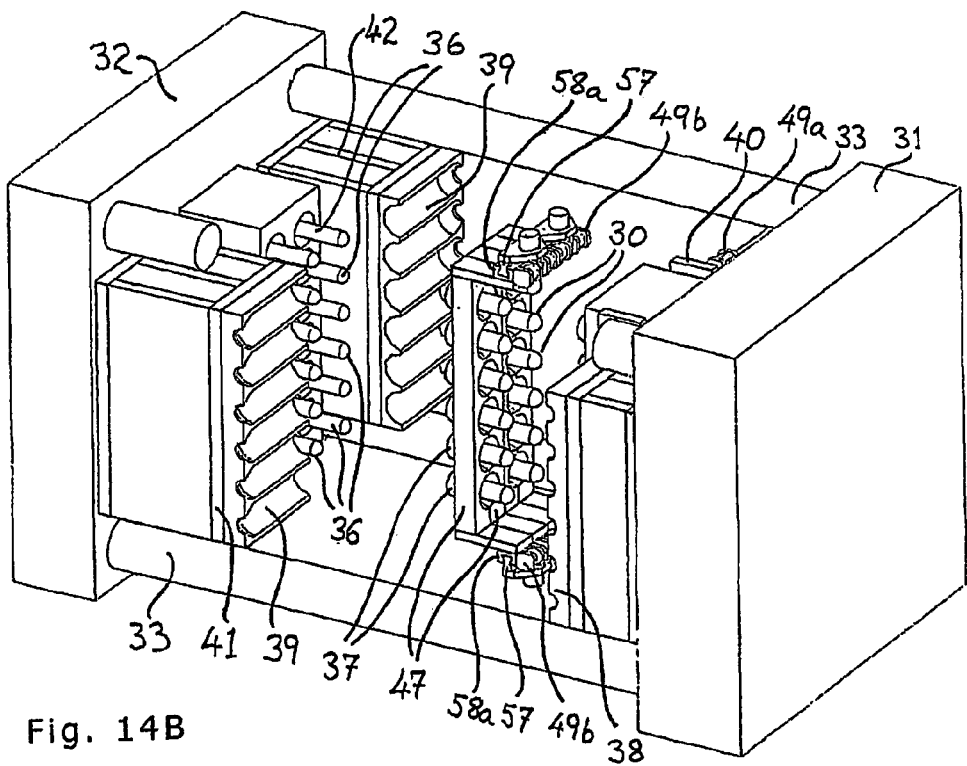

FIGS. 14(a) and 14(b) illustrate the main components of the mould set when in the open position, in two perspective views. FIG. 14(a) shows the cavity side of the mould set, looking towards the stationary clamp plate 31, while FIG. 14(b) shows the core side of the mould set, looking towards the moving clamp plate 32. Some parts of the composite mould set are fixed to the stationary plate 31, some other parts of the composite mould set are fixed to the moving plate 32, while the remaining parts which are the neck formers 37 fixed on neck split plates 47 are free to move independently from the clamp plates 31 and 32. The tie bar 33 that would partly block the view is shown as cut for clarity.

The array of female cavities 35 of the injection mould are fixed to the stationary plate 31 while a complementary array of male cores 36 that co-operate with the female cavities 35 are fixed to the moving plate 32. There are two rows of blow cavities, each row placed on either side of the injection mould, consisting of body mould halves 38 and base cavity rows 40 fixed to the stationary plate 31, and body mould halves 39 fixed to the moving plate 32. The body mould halves 38 and 39 are mounted on supporting plates 41, which are held to the clamp plates 31 and 32 by spacer plates 42. The rows of base cavities 40 can be moved towards or away from their corresponding body mould halves 38 and 39 by base actuators 49a.

The neck formers 37 and the neck split plates 47 onto which they are mounted, are not fixed to either of the clamp plates 31 and 32, but are free to move away from the stationary plate 31 but independently of the movement of the moving plate 32. Such freedom of movement is required for the effective transfer of the preforms 30, which are held by the neck formers 37. Since the neck formers 37 and the neck split plates 47 onto which they are mounted, are not fixed to either of the clamp plates 31 and 32, they must be supported on a structure, which must be able to move in order to locate the neck formers 37 and split plates 47 between the stationary and the moving mould set parts.

Each neck former 37 is made of two halves, which must split open in order to release the preform that it holds. Each row of neck formers 37 is mounted on two split plates 47, which can move apart in order to split open the neck formers 37 for releasing the preforms 30. As a result there are two pairs of split plates 47, one pair for each of the two rows of neck formers 37. Each pair of split plates 47 can open and close by the movement of split actuators 49b. Each of the four split plates has two corresponding split actuators 49b, one mounted at the top and one mounted at the bottom of each split plate 47, both such actuators moving simultaneously to achieve the opening and closing movement of the split plates. Such movements are facilitated by the use of linear bearings, consisting of split guiding rails 57 and split carriages 58a. The split carriages 58a are mounted on extensions of the split plates 47 and are guided to slide linearly along the split rails 57.

Figure 15:
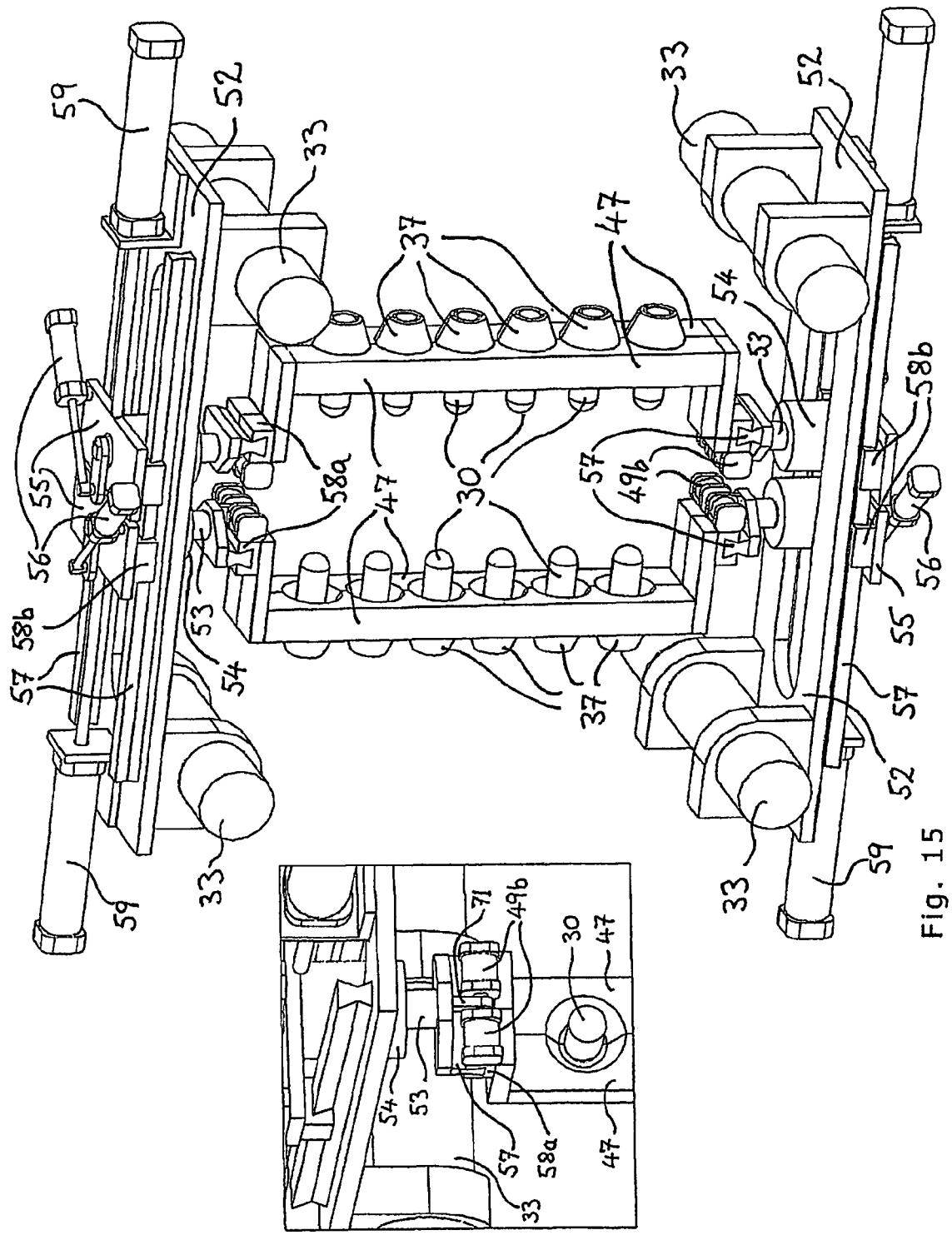

The movements of the neck holders 37 necessary for transferring the preforms 30 to their stretch blowing position are achieved by a preform transfer mechanism. FIG. 15 illustrates such a mechanism in perspective view, showing that it can consist of two identical sets of components, mounted on two support plates 52, one supported and guided by the top two tie bars 33 and the other by the bottom two tie bars 33. In this way the whole mechanism can move parallel to the movement of the moving plate 31, guided by the tie bars 33, firmly holding the neck formers 37 from top and bottom. For clarity FIG. 15 does not show the clamp plates and the mould set parts fixed to the clamp plates, but shows the preform transfer mechanism having rotated the neck formers 37 holding the preforms 30 by ninety degrees after mould opening.

In this embodiment, three sets of movements are required for successful preform transfer. Firstly the mechanism should be able to rotate the neck formers through ninety degrees, in order to align the preforms 30 with the axis of the blow cavities. This is achieved by holding from above and below the neck former assemblies (each assembly consisting of one row of neck formers 37 and their corresponding split plates 47, sliding split rails 57, split carriages 58a and split actuators 49b) on rods 53, which can be rotated. Such rods 53 are held via bearing housings 54 in a way that they are free to rotate about their axis, thus rotating the neck former assemblies. The bearing housings 54 are mounted on sliding plates 55, which are not free to rotate. The rods 53 can then be rotated by the rotation actuators 56, which are pivot mounted on the corresponding sliding plates 55. Although for each row of neck formers 37 one rotation actuator 56 could be sufficient, two such actuators are used for each neck former assembly in the present embodiment, one at the top and one at the bottom, for more symmetrical applied torque.

Secondly the mechanism should be able to move the neck former assemblies linearly, in a direction perpendicular to the mould opening and closing direction, in order to deliver the preforms to the blow cores at their stretch blowing location. This is achieved by mounting the sliding plates 55 on linear bearings, consisting of sliding rails 57 and sliding carriages 58b. Additionally sliding actuators 59 are mounted on the mounting plates 52 and connected to the sliding plates 55, so that they can move the sliding plates linearly back and forth in the required direction. This achieves the required linear movement of the neck former assemblies because they are mounted on the rods 53, which are connected to the bearing housings 54, which are themselves mounted on the sliding plates 55. The sliding actuators 59 should operate simultaneously in order to maintain the vertical orientation of the split plates 47.

Thirdly the two split plates 47, of each pair of split plates 47, should be able to move apart from each other in order to release the preforms 30 once they have engaged onto the blow cores. This is achieved by the split actuators 49b shown in the enlarged inset of FIG. 15. Each of these split actuators 49b can be mounted on each of the split carriages 58a, which are free to slide, and connected to a plate 71 that is stationary in relation to the split guiding rails 57. In this way, when the split actuators 49b operate, they move the split carriages 58a, and therefore the split plates 47, so that they open and close the neck formers 37 to release the preforms 30. To maintain parallel movements, all eight split actuators 49b should operate simultaneously. With these three sets of movements of the preform transfer mechanism, the preforms can be delivered to the blow cores for stretch blowing.

Figure 16C:
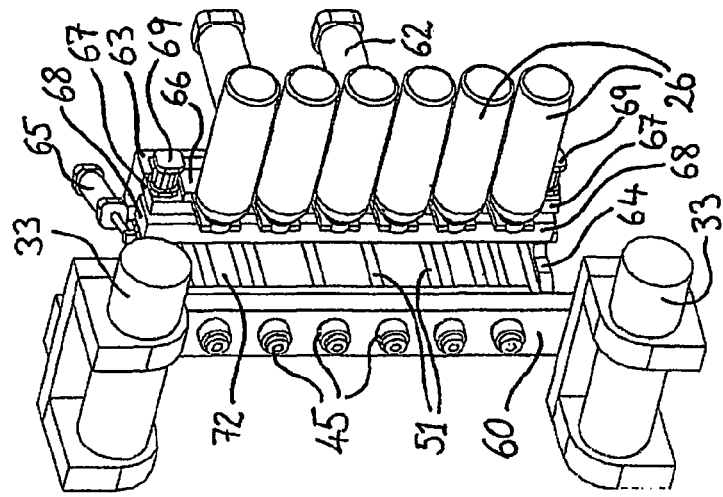
FIGS. 16(a), 16(b) and 16(c) are respective perspective views of the stretch blowing and container removal mechanisms.
Figure 16B:
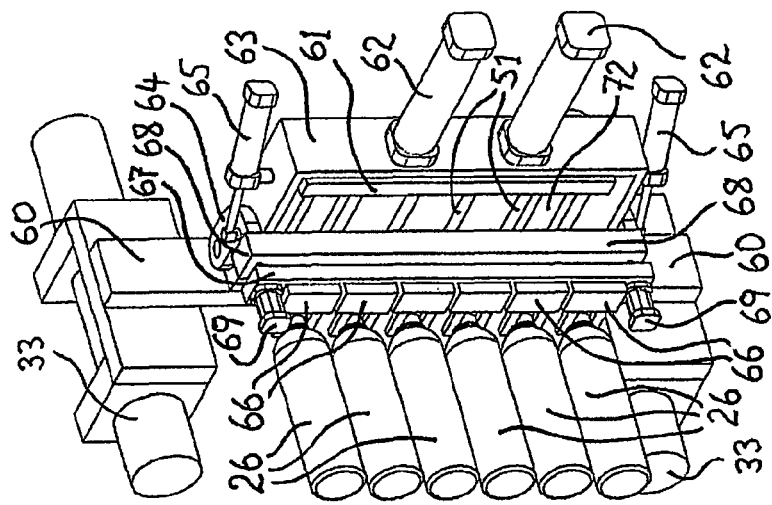
Figure 16A:
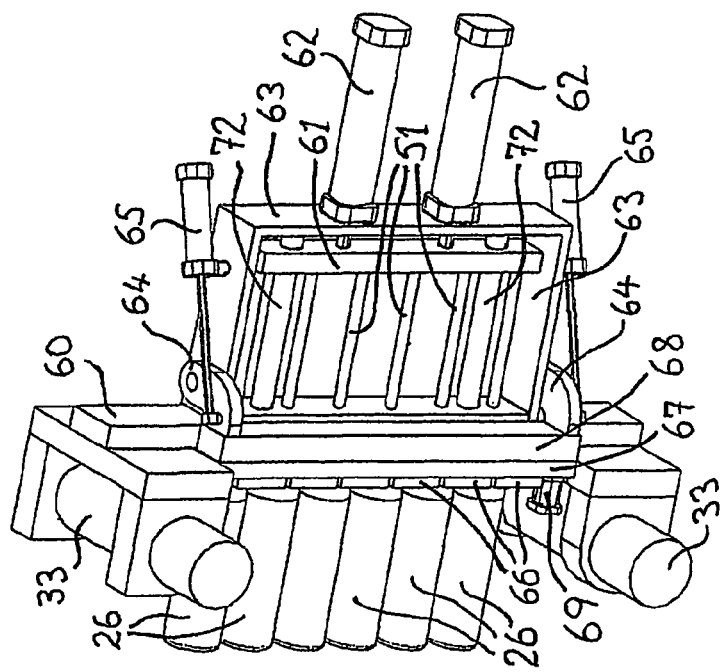

In this embodiment, the stretch blowing mechanism and the container removal mechanism are mounted together and are illustrated in FIG. 16, which shows these mechanisms in three perspective views, 16(a), 16(b) and 16(c). For clarity only one set of these mechanisms is shown in FIG. 16, which corresponds to the right-hand row of blow cavities and is mounted on a vertical blow core plate 60, which is itself supported on the two right tie bars 33. Correspondingly there is a second (not shown) identical (mirror image) set of these mechanisms for the left-hand row of blow cavities, which is supported on the left two tie bars 33. FIG. 16(a) shows the mechanisms after the containers 26 have been stretch blown and the mould has opened but before the containers 26 have been removed. FIG. 16(b) shows the containers 26 having been removed from the mould area by the container removal mechanism, which achieved this by a rotary motion of ninety degrees. FIG. 16(c) shows the same position as the second view, but viewed from a different angle, looking towards the blow cores 45.

The stretch blowing mechanism is similar to those used in the existing art and consists of a row of blow cores 45 mounted on the blow core plate 60, a corresponding row of stretch rods 51 passing through the blow cores 45 and fixed to a stretch rod plate 61, which is free to move linearly guided by two guide rods 72 so that it can move the stretch rods 51. Additionally the stretch blowing mechanism consists of two stretch actuators 62 mounted on a stretch frame 63 and connected to the stretch rod plate 61 so that, when they operate, the stretch rods move linearly to stretch the preforms longitudinally and then retract. The stretch frame 63 is itself rigidly mounted on the blow core plate 60 so that the whole stretch blowing mechanism can move linearly guided by the tie bars 33, in a direction parallel to the mould opening and closing direction.

As shown in FIG. 16, the container removal mechanism is pivot mounted on the stretch frame 63 via pivot plates 64, which can be rotated by container removal actuators 65, which are themselves also pivot mounted on the stretch frame 63. The container removal mechanism consists of a vertical row of neck grippers 66, each one corresponding to one blow cavity, mounted on a gripper plate 67. The gripper plate 67 can move linearly relative to a removal plate 68, in order to release the container necks from the blow cores, by the operation of release actuators 69 mounted on the gripper plate 67. The removal plate 68 is mounted on the pivot plates 64 so that when the removal actuators 65 operate, the whole container removal mechanism rotates by ninety degrees and the ready containers 26 are moved away from the mould set area. Before this rotation, however, the containers 26 must be released from the blow cores 45 by a linear movement of the containers 26 away from the blow cores 45, which is achieved by the operation of the release actuators 69.

Figure 17:
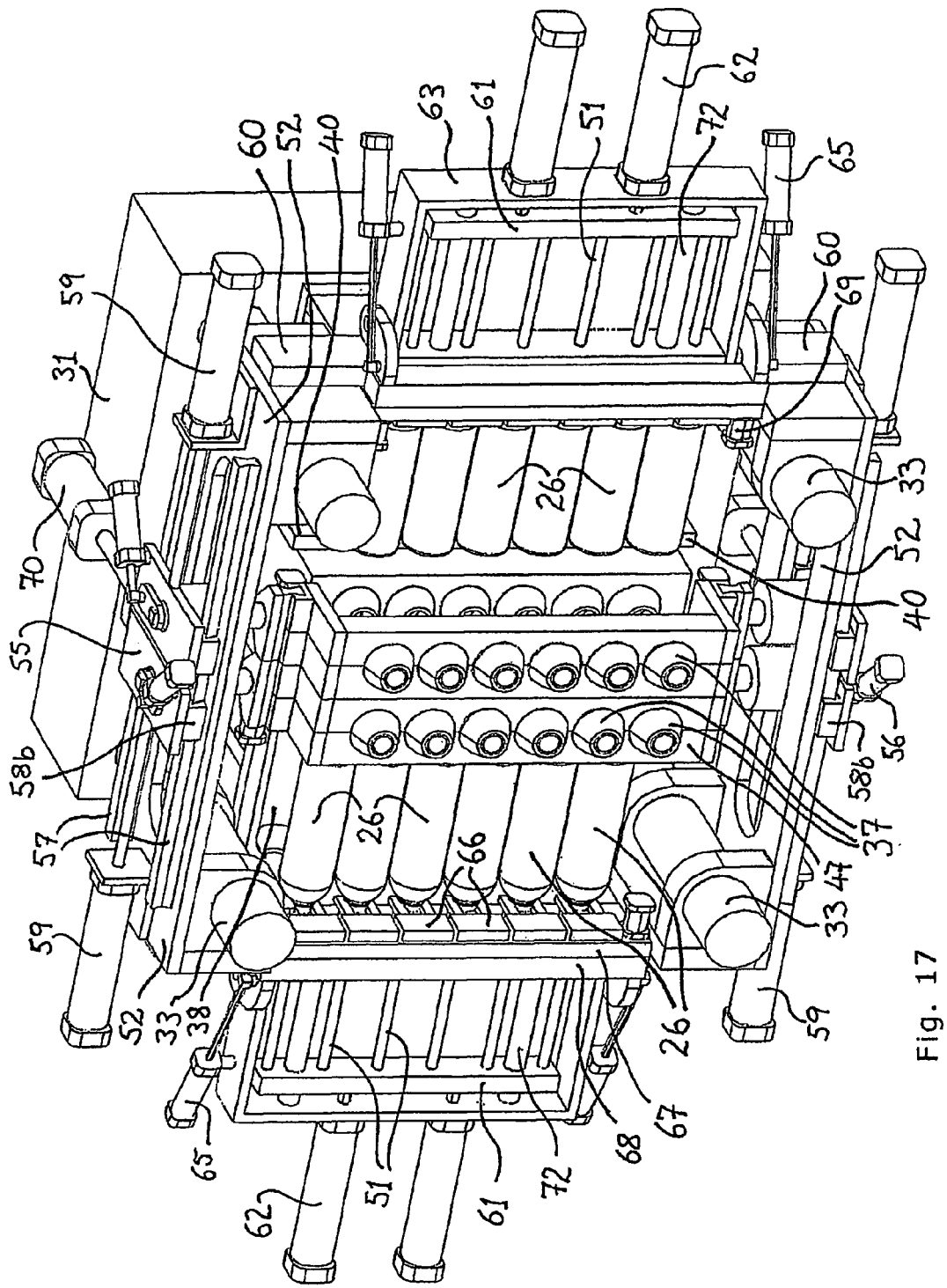

The preform transfer mechanism, the stretch blowing mechanisms and the container removal mechanisms are all mounted on plates guided by the tie bars of the injection moulding machine. These mechanisms must all be kept aligned with each other in order to facilitate the operations of bottle removal, preform transfer, stretching and blowing; because their operations are related to each other and to their relative positions. It is convenient, therefore, to connect all these mechanisms together on a common frame, mounted on the tie bars of the injection moulding machine so that they can be kept aligned and moved together. FIG. 17 illustrates this arrangement, showing all the mechanisms mounted together on a common frame, which is composed mainly of the support plates 52 of the preform transfer mechanism and the blow core plates 60 of the stretch blowing mechanism.

For clarity, FIG. 17 does not show the moving clamp plate and the mould set parts fixed to it. The mechanisms illustrated are at the position at the end of the mould-opening phase of the production cycle. At this position the preforms that have just been moulded are held by the neck formers 37 and the containers 26 that have just been stretch blown are held by the blow cores. It must be noted that just before the mould opening starts, the rows of blow mould base cavities 40 retract away from the blow mould body halves 38, so that the containers 26 are free to move away from the stationary blow mould body halves 38 when the mechanisms (and with them the containers 26) are moved. This movement of the mechanisms is made during the mould opening phase, by the operation of two frame actuators 70, which are mounted on the stationary plate 31 and fixed to the preform transfer support plates 52.

Figure 18:
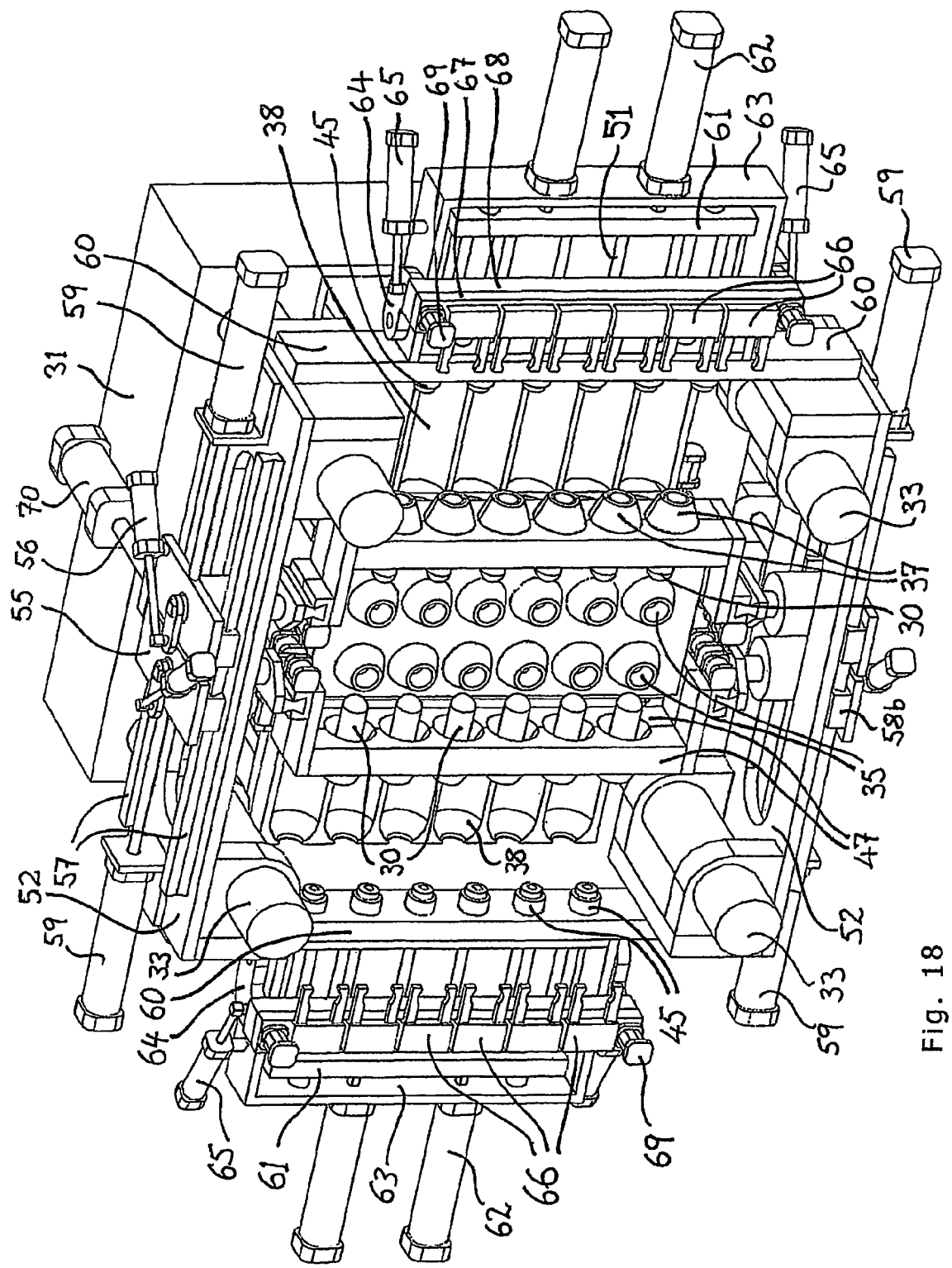
Figure 19:
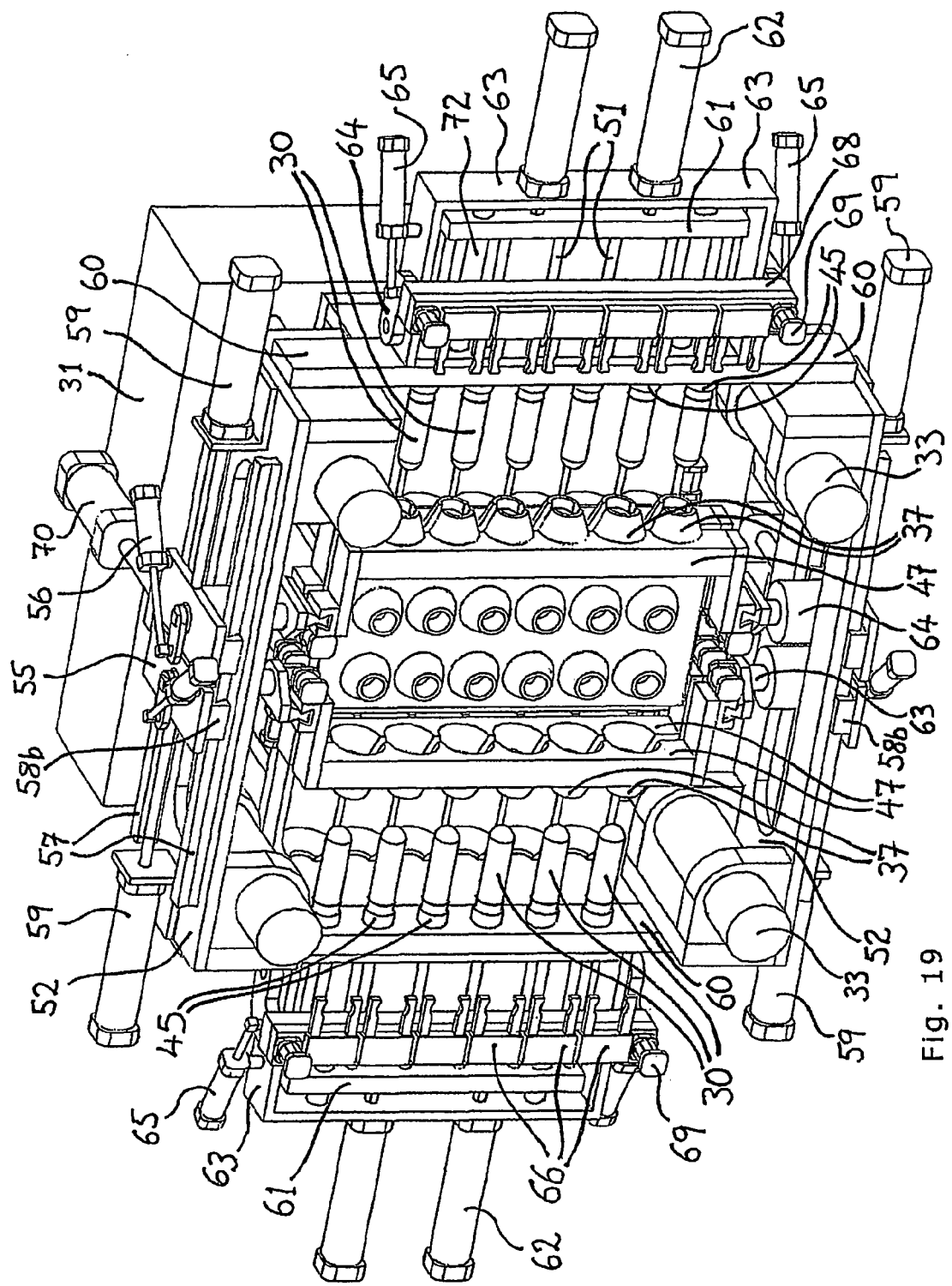
Figure 20:
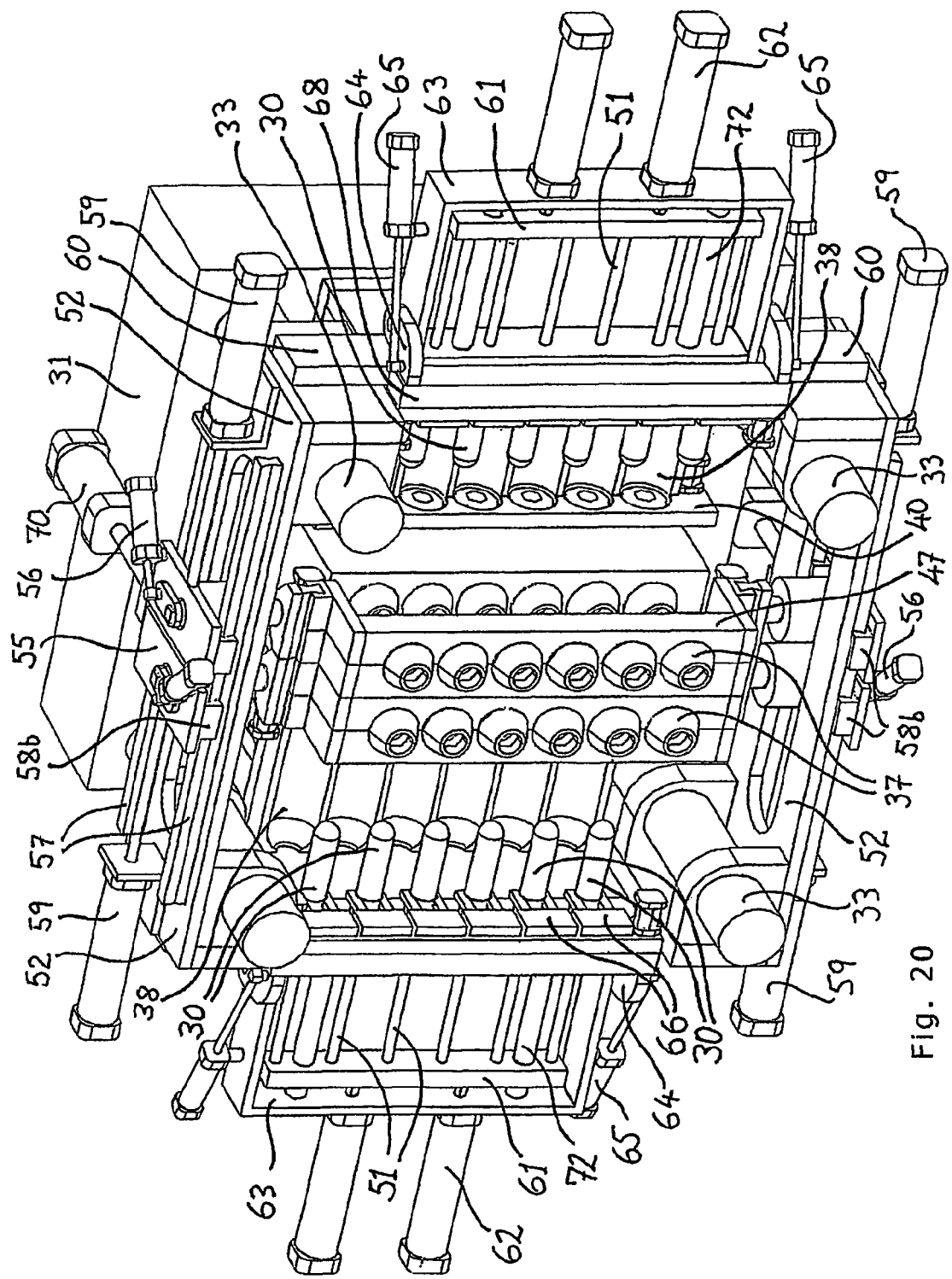

FIGS. 18, 19 and 20 illustrate the operation of all the mechanisms at various stages during the mould open phase of the production cycle, showing perspective views from the same view-point as is used for FIG. 17. Similarly, the moving clamp plate and the mould set parts fixed to it are not shown for clarity. FIG. 18 illustrates the position of the mechanisms after the following operations have taken place in the time interval between FIGS. 17 and 18:

a) The container removal mechanisms have rotated through ninety degrees.

b) The grippers 66 on the container removal mechanisms have opened, thus releasing the containers.

c) The preform holders 37 have rotated through ninety degrees, aligning the preforms 30 with the blow cores 45.

Further along the production cycle, the preform holders deliver the preforms 30 onto the blow cores 45, as illustrated in FIG. 19. In the time interval between FIGS. 18 and 19, the following operations have taken place:

a) The neck formers 37 have moved linearly towards their corresponding blow cores 45, until the necks of the preforms 30 engaged properly with the blow cores 45.

b) The two neck split plates 47 in each of the two pairs of neck split plates 47, moved away from each other, splitting open the neck formers 37 so as to release the preforms 30.

c) The neck formers 37 moved linearly away from their corresponding blow cores 45, leaving the preforms 30 on the blow cores 45.

FIG. 20 illustrates the mechanisms when all the movements required during the mould open phase of the production cycle have been completed and just before the moving plate starts to close the composite mould set. In the time interval between FIGS. 19 and 20, the following operations have taken place:

a) The container removal mechanism has rotated through ninety degrees, moving in a position to hold the necks of the preforms 30.

b) The grippers 66 on the container removal mechanism have closed, thus gripping the necks of the preforms 30.

c) The neck formers 37, which were split open, have now closed.

d) The neck formers 37 have rotated through ninety degrees, taking the right position for mould closing.

Alternatively, movements a) and b) can be omitted, in which case the container removal mechanism will remain outside the mould set area during the mould closed phase of the production cycle. In this case, the container removal mechanism would have to move in during the mould opening phase of the production cycle, by rotating ninety degrees to reach the position needed to grip the ready containers 26 and remove them from the blow cores 45 when the mould has opened.

Once the position illustrated in FIG. 20 has been reached, the mould set can close, ready for the next cycle. It must be noted that in order to save time some movements of the mechanisms can be made wholly or partly during the mould-closing and/or the mould-opening phases.

When the mould closes, the injection of molten plastic into the injection cavity can take place, following which, time is given for cooling the molten plastic in the cavities to form the preforms and bring them to a temperature suitable for stretch blowing. In parallel to the injection and cooling of the plastic, the stretch blow moulding of the preforms moulded in the previous cycle takes place. For this, the mould base cavities 40 move towards the blow mould body halves 38 and 39 in order to close the blow cavities completely, the stretch rods move linearly and stretch the preforms, and blowing air enters the preforms via the blow core plates and the blow cores, thus blowing them into containers that take the shape of the blow cavities. Some time is allowed for cooling of the blown containers and then the blowing air is exhausted from the cavities and the stretch rods are retracted. The mould set is then ready for the mould-opening phase of the production cycle.

The descriptions of the operation of various embodiments and variants of the present invention (illustrated in FIGS. 6 to 20) were based by way of example on an arrangement of two-row preform cavities as illustrated in FIG. 1. As an example of the implementation of the present invention using a different cavity arrangement, the operation of an embodiment based on two injection and two blow cavities as illustrated in FIG. 5, will now be briefly described.

FIG. 21 illustrates the operation of an arrangement comprising two sets of two cavities, by showing elevation views at various stages during the production cycle. FIG. 21(a) illustrates the composite mould set at the end of the mould-opening phase of the production cycle. The stretch rods 51 have fully retracted and the blow cores 45 have moved upwards, disengaging from the preform holders 43. The preform holders 43 are holding the containers 26 that were stretch blown in the last production cycle, while the neck formers 37, mounted on split plates 47, are holding the preforms 30 that were injection moulded in the last production cycle. Rather than both neck formers 37 being held by one pair of split plates 47, each neck former 37 has its own pair of split plates 47, so that the two preforms 30 held by the two neck formers 37 can be rotated independently and in different directions.

Figure 21A:
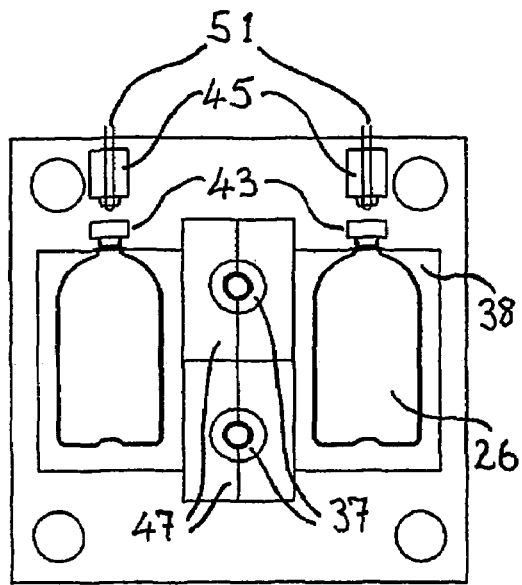
FIGS. 21(a) to 21(d) are respective elevation views of an embodiment of composite injection-blow mould set comprising two injection cavities and two blow cavities, at various steps in the production cycle.
Figure 21C:
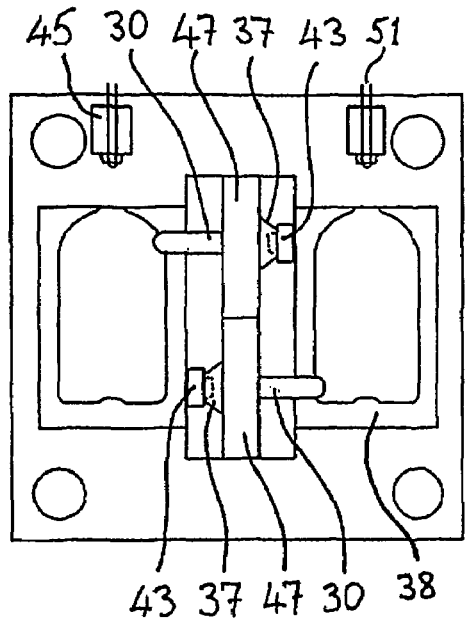
Figure 21B:
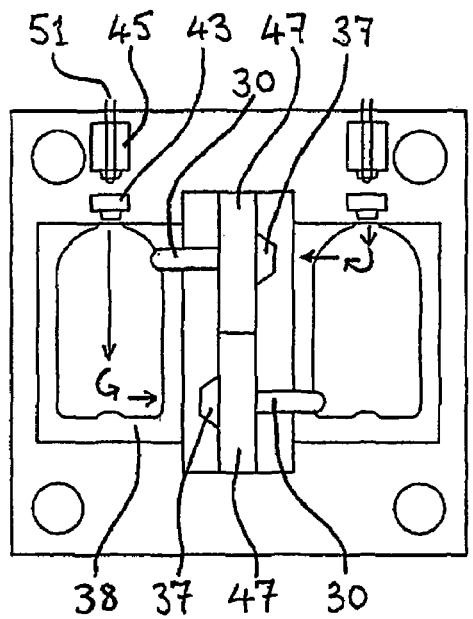

In FIG. 21(b), further along the mould open phase of the production cycle, the ready containers 26 have been removed by an independent container removal mechanism (not shown). The split plates 47 have rotated through 90 degrees about a vertical axis, in such a way that the top preform is rotated in the opposite direction to the bottom preform's rotation. In this way the necks of the preforms are facing towards their respective blow mould cavities, the top preform neck facing right and the bottom preform neck facing left. The arrows in FIG. 21(b) illustrate the movements that preform holders 43 could make in order to engage the necks of the preforms, namely a downward linear motion, a ninety degrees rotary motion about a horizontal axis and a sideways linear motion. These movements would bring the neck holders 43 to the position of FIG. 21(c).

Figure 21D:
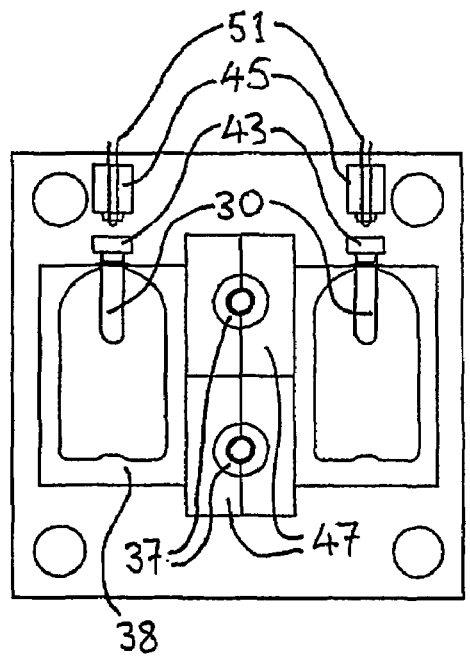

By the end of the mould open phase of the production cycle, the neck holders 43 must return to their original positions, delivering the preforms 30 to the correct locations for stretch blowing and the split plates must rotate through ninety degrees to be ready for mould closing. This position just before mould closing starts is illustrated in FIG. 21(d). In the time interval between FIGS. 21(c) and (d), the following operations take place:

a) The two split plates 47 of each neck holder 37 move apart from each other, to split open the neck holders 37, releasing the preforms 30.
b) The neck holders 37 retrace their previous movements in reverse, delivering the preforms 30 that they are holding to the correct stretch blowing positions.
c) The split plates 47 move towards each other to close the neck formers 37.
d) The neck formers 37 and split plates 47 rotate through ninety degrees, to take their positions ready for mould closing.

The mould set can then close so that while in the closed position the next set of preforms can be injection moulded while in parallel the stretch blowing mechanisms move downwards to engage the preform holders and stretch blow the two preforms just placed in the blow cavities into ready containers. After allowing for cooling time, the mould can open to start the next production cycle. It must be noted that in this embodiment of the present invention, a frame supported and guided by the tie bars can be used, similar to that described in the previous embodiment. Such a frame would hold the neck formers with their split plates, the neck holders and if desired also possibly the container removal mechanisms and the stretch blowing mechanisms.

The invention claimed is:

1. A mould set for use in a method of moulding plastic articles wherein a preform is injection-moulded in an injection moulding cavity and the injection-moulded preform is blow-moulded in a blow-moulding cavity, said mould set comprising:
   an array of injection-moulding cavities; and
   an array of generally elongate blow-moulding cavities, each of the blow-moulding cavities having a neck region and a longitudinal axis,
   wherein each of the cavities in each of the arrays is defined by at least two mould parts separable in a respective mould separation direction,
   the mould separation directions of said injection-moulding cavities and of said blow-moulding cavities each define a common mould separation direction whereby the mould set opens and closes in the common mould separation direction to release both of the injection-moulded preforms and the blow-moulded products,
   the longitudinal axes of the blow-moulding cavities extend generally perpendicularly to the common mould separation direction and the neck regions are disposed adjacent to an edge of the mould set to be externally accessible in a direction that is transverse relative to the mould-separation direction and to the axes of said opening and closing movement, and
   the longitudinal axes of the injection-moulding cavities are arranged to extend generally parallel to the common mould separation direction.

2. A mould set as claimed in claim 1, wherein the blow-moulding cavities are disposed in an array to one or both sides or towards the top and/or bottom of the mould set.

3. A mould set as claimed in claim 1, wherein the injection-moulding cavities are disposed in a generally central array in the mould set.

4. A mould set as claimed in claim 1 wherein each injection-moulding cavity is aligned with a respective blow-moulding cavity.

5. A mould set as claimed in claim 4, wherein the blow-moulding cavities are arranged as a group of a preset number (n) of rows (or columns) of a preset number (m) of cavities on one side of the mould set and a generally symmetric group of said preset number (n) of rows (or columns) of (m) cavities on an opposite side of the mould set, with the necks of the blow-moulding cavities facing outwardly on the edges of the mould sets, and the injection-mould cavities are disposed between the two groups of blow-moulding cavities, and arranged in a rectangular array of (2n×m) cavities.

6. A mould set as claimed in claim 5, comprising at least two rows (or columns) of blow-moulding cavities on each side of said moulding set, the rows (or columns) being stacked in the direction of the common mould-separation direction.

7. A mould set as claimed in claim 4, wherein the blow-moulding cavities are disposed in two rows (or columns) of cavities at equal spacing, one to either side of the mould set, with the rows or columns being offset with respect to each other by one half the cavity spacing, and the injection-moulding cavities are disposed in a single column or row disposed generally centrally between the moulding cavities and each being aligned with a respective blow-moulding cavity.

8. A mould set according to claim 1, comprising two main body portions, and a plurality of modular, removable or replaceable mould set components.

9. A mould set according to claim 8, wherein said modular mould set components include one or more of the following:
- injection cores,
- injection neck formers,
- injection cavity plates (housings),
- injection cavities, and
- blow cavities.

10. An injection moulding apparatus for injection and stretch blow-moulding of plastic articles, said apparatus comprising:
- a mould set, comprising:
  - an array of injection-moulding cavities; and
  - an array of generally elongate blow-moulding cavities, each of the blow-moulding cavities having a neck region and a longitudinal axis,
- wherein each of the cavities in each of the arrays is defined by at least two mould parts separable in a respective mould separation direction,
- the mould separation directions of said injection-moulding cavities and of said blow-moulding cavities define a common mould separation direction whereby the mould opens and closes in the direction along the axis of the common mould separation to release injection-moulded preforms and blow moulded products, and
- the longitudinal axes of the blow moulding cavities are arranged to extend generally perpendicularly to the common mould separation direction and neck regions are disposed adjacent to an edge of the mould set to be externally accessible in a direction that is transverse relative to the axis of said opening and closing movement,
- the longitudinal axes of the injection-moulding cavities are arranged to extend generally parallel to the common mould separation direction,
- an injection means for injecting plastics material into said injection-moulding cavities to produce said injection-moulded preforms,
- a mould opening means for opening and closing said mould set to allow release of the injection-moulded preforms and the blow-moulded products,
- a preform transfer means for transferring the injection-moulded preforms from the injection-moulding cavities to the blow-moulding cavities, and
- a blow-moulding means associated with said blow-moulding cavities and operable for blow-moulding the injection-moulded preforms thereinto.

11. An injection moulding apparatus according to claim 10, including two facing platen means mounted on a base structure, wherein a first part, or array of parts, of said mould set is secured to one of said platen means and a second part, or array of parts, of said mould set is secured to the other of said platen means, the apparatus further including platen drive means for effecting relative linear movement of said mould parts between a closed position and an open position, to serve as said mould opening means.

12. An injection-moulding apparatus according to claim 11, wherein said blow-moulding means are disposed generally transversely of said mould set and are operable to apply blow-moulding pressure via said neck region.

13. An injection moulding apparatus according to claim 12, including elongate stretch means operable to be introduced in use transversely into the cavity within a preform held in a blow-moulding cavity, thereby to apply a stretching force before or during the blow-moulding.

14. An injection-moulding apparatus according to claim 10, including an array of injection core means and an array of injection neck forming means, for cooperating with said array of injection-moulding cavities.

15. An injection-moulding apparatus according to claim 14, wherein the number of injection-mould core means is equal to the number of injection-moulding cavities.

16. An injection-moulding apparatus according to claim 14, wherein the number of injection-mould core means is an integral multiple of the number of injection-moulding cavities.

17. An injection-moulding apparatus according to claim 14, wherein the number of injection neck-forming means is equal to the number of injection-moulding cavities.

18. An injection-moulding apparatus according to claim 14, wherein the number of injection neck-forming forming means is an integral multiple of the number of injection-moulding cavities.

19. An injection-moulding apparatus according to claim 17, wherein the array of neck-forming means is operable in use to transfer the injection-moulded preforms from the array of injection-moulding cavities along at least part of the way to the array of blow-moulding cavities.

20. An injection-moulding apparatus according to claim 17, including perform transfer means for transferring in use injection-moulded preforms to the blow-moulding cavities from at least part of the way along the path from the injection-moulding cavities.

21. An injection-moulding apparatus according to claim 20, wherein said preform transfer means comprises an array of neck gripping means for engaging in use the neck of a preform.

22. An injection moulding apparatus according to claim 13, which comprises actuation means for introducing and withdrawing said elongate stretch means to and from the blow-moulding cavities, said actuation means being further operable to apply movement to move said preforms from said injection-moulding cavities to said blow-moulding cavities and/or to transfer said blow-moulded products from said blow-moulding cavities.

23. An injection moulding apparatus for injection blow-moulding of plastic articles, said apparatus comprising:
- a mould set, comprising:
  - an array of injection-moulding cavities; and
  - an array of generally elongate blow-moulding cavities, each having a neck region and a longitudinal axis,
- wherein each of the cavities in each of the arrays is defined by at least two mould parts separable in a respective mould separation direction,
- the mould separation directions of said injection-moulding cavities and of said blow-moulding cavities define a common mould separation direction whereby the mould set opens in the direction of the common mould separation to release injection-moulded preforms and blow moulded products, and
- the longitudinal axes of the blow moulding cavities are arranged to extend generally perpendicularly to the common mould separation direction and the neck regions are disposed adjacent to an edge of the mould set to be externally accessible in a direction that is transverse relative to the opening and closing movement,
- an injection means for injecting plastics material into said injection-moulding cavities to produce said injection-moulded preforms,
- a mould opening means for the opening and closing movement of said mould set to allow release of injection-moulded preforms and blow-moulded products, a preform transfer means for transferring the injection-moulded preforms from the injection-moulding cavities to the blow-moulding cavities, a blow-moulding means associated with said blow-moulding cavities and operable for blow-moulding the injection-moulded preforms thereinto, and a thermal conditioning means for exposing said injection moulded preforms to a thermal conditioning step following injection moulding thereof and prior to said blow moulding.

24. A method of blow-moulding plastic articles, comprising the steps of:

providing a mould set, comprising:

an array of injection-moulding cavities, each of the injection-moulding cavities having a longitudinal axis; and an array of generally elongate blow-moulding cavities, each of the blow-moulding cavities having a neck region and a longitudinal axis, wherein each of the cavities in each of the arrays is defined by at least two mould parts separable in a respective mould separation direction, the mould separation directions of said injection-moulding cavities and of said blow-moulding cavities define a common mould separation direction whereby the mould opens and closes in the common mould separation direction to release injection-moulded preforms and blow moulded products, the longitudinal axes of the blow moulding cavities extend generally perpendicularly to the common mould separate direction and the neck regions disposed adjacent to an edge of the mould set and are externally accessible in a direction that is transverse relative to the axis of said opening and closing movement;

the longitudinal axes of the injection-moulding cavities are arranged to extend generally parallel to the common mould separation direction, locating a plurality of previously injection-moulded preforms in said blow-moulding cavities;

closing said mould set;

forming injection-moulded preforms using said injection-moulding cavities;

stretching and/or blow-moulding said previously injection-moulded preforms into said blow-moulding cavities;

opening said mould set to release said injection-moulded preforms and said blow-moulded products; and transferring said injection-moulded preforms to said blow-moulding cavities.

25. A method according to claim 24, operated cyclically, wherein in each period between the mould closing and the mould opening, a plurality of injection-mould preforms are formed in the injection-moulding cavities and a plurality of previously formed injection moulded performs are blow-moulded in said blow-moulding cavities.

26. A method of blow-moulding plastic articles, comprising the steps of:

providing a mould set, comprising:

an array of injection-moulding cavities; and an array of generally elongate blow-moulding cavities, each of the blow-moulding cavities having a neck region, wherein each of the cavities in each of the arrays is defined by at least two mould parts separable in a respective mould separation direction, the mould separation directions of said injection-moulding cavities and of said blow-moulding cavities define a common mould separation direction whereby the mould set opens and closes in the common mould separation direction to release injection-moulded preforms and blow moulded products, the blow moulding cavities extend generally perpendicularly to the common mould separate direction and the neck regions disposed adjacent to an edge of the mould set and are externally accessible in a direction that is transverse relative to the axis of said opening and closing movement;

locating a plurality of previously injection-moulded preforms in said blow-moulding cavities;

closing said mould set;

forming injection-moulded preforms using said injection-moulding cavities;

stretching and/or blow-moulding said previously injection-moulded preforms into said blow-moulding cavities;

opening said mould set to release said injection-moulded preforms and said blow-moulded products; and transferring said injection-moulded preforms to said blow-moulding cavities, wherein said injection moulded preforms are exposed to a thermal conditioning step following release from injection-moulding thereof and prior to said blow-moulding.

* * * * *

UNITED STATES PATENT AND TRADEMARK OFFICE
CERTIFICATE OF CORRECTION

PATENT NO. : 7,611,658 B2 Page 1 of 1
APPLICATION NO. : 10/568311
DATED : November 3, 2009
INVENTOR(S) : Constantinos Sideris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twelfth Day of October, 2010

David J. Kappos
*Director of the United States Patent and Trademark Office*